(12) United States Patent
Graham et al.

(10) Patent No.: US 11,165,273 B2
(45) Date of Patent: Nov. 2, 2021

(54) WIRELESS CHARGING SYSTEMS FOR ELECTRONIC DEVICES

(71) Applicant: Apple Inc., Cupertino, CA (US)

(72) Inventors: Christopher S. Graham, San Francisco, CA (US); Karl Ruben F. Larsson, Los Altos, CA (US); Grant S. Haug, Mountain View, CA (US); Aaron A. Oro, Palo Alto, CA (US); Benjamin J. Pope, Mountain View, CA (US); Sherry Lee, Oakland, CA (US); Tang Yew Tan, Palo Alto, CA (US); Richard Hung Minh Dinh, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 16/422,750

(22) Filed: May 24, 2019

(65) Prior Publication Data

US 2019/0363565 A1 Nov. 28, 2019

Related U.S. Application Data

(60) Provisional application No. 62/676,419, filed on May 25, 2018, provisional application No. 62/720,001, (Continued)

(51) Int. Cl.
*H02J 7/02* (2016.01)
*H01F 38/14* (2006.01)
(Continued)

(52) U.S. Cl.
CPC .............. *H02J 7/025* (2013.01); *H01F 27/36* (2013.01); *H01F 38/14* (2013.01); *H02J 50/10* (2016.02); *H02J 50/70* (2016.02); *H02J 50/90* (2016.02)

(58) Field of Classification Search
CPC .. H02J 7/025; H02J 50/10; H02J 50/70; H02J 50/90; H02J 7/02; H02J 7/342;
(Continued)

(56) References Cited

U.S. PATENT DOCUMENTS 8,947,041 B2 2/2015 Cook et al.
9,112,363 B2 8/2015 Partovi
(Continued)

FOREIGN PATENT DOCUMENTS

KR 20150067520 A 6/2015
WO 2018057328 A1 3/2018

OTHER PUBLICATIONS

"European Search Report," dated Jun. 9, 2020 in 20160209.1 8 pages.
(Continued)

*Primary Examiner* — Paul Dinh
(74) *Attorney, Agent, or Firm* — Kilpatrick Townsend & Stockton LLP

(57) ABSTRACT

Embodiments describe a portable electronic device that includes a housing having an interface surface and an inductor coil disposed within the housing and comprising a conductive wire wound in a plurality of turns about a center point and in increasing radii such that the inductor coil is substantially planar. The portable electronic device further includes charging circuitry coupled to the inductor coil and configured to operate the inductor coil to wirelessly receive power and wirelessly transmit power, control circuitry coupled to the charging circuitry and configured to instruct the charging circuitry to operate the inductor coil to wirelessly receive power and to wirelessly transmit power, and a device detection coil coupled to the control circuitry and configured to detect the presence of an external device on the
(Continued)

charging surface, the device detection coil is configured to operate at a different frequency from the inductor coil.

18 Claims, 14 Drawing Sheets

Related U.S. Application Data filed on Aug. 20, 2018, provisional application No. 62/834,323, filed on Apr. 15, 2019.

(51) Int. Cl.
| | |
|---|---|
| *H02J 50/90* | (2016.01) |
| *H02J 50/70* | (2016.01) |
| *H02J 50/10* | (2016.01) |
| *H01F 27/36* | (2006.01) |

(58) Field of Classification Search
CPC ........ H02J 7/0042; H01F 27/36; H01F 38/14; H01F 27/40; H01F 27/2871
USPC .......................................... 307/104; 320/108
See application file for complete search history.

(56) References Cited

U.S. PATENT DOCUMENTS

| | | |
|---|---|---|
| 9,762,083 B2 | 9/2017 | Nam et al. |
| 9,893,553 B2 | 2/2018 | Pudipeddi et al. |
| 2010/0127660 A1 | 5/2010 | Cook et al. |
| 2012/0229071 A1 | 9/2012 | Schuessler |
| 2013/0026981 A1 | 1/2013 | Van Der Lee |
| 2014/0002228 A1 | 1/2014 | Hatanaka et al. |
| 2015/0115724 A1* | 4/2015 | Park ........................ H02J 7/025 307/104 |
| 2015/0137749 A1 | 5/2015 | Park |
| 2016/0020633 A1 | 1/2016 | Han et al. |
| 2016/0268845 A1 | 9/2016 | Wang et al. |
| 2017/0033611 A1 | 2/2017 | Shin et al. |
| 2017/0194809 A1 | 7/2017 | Partovi et al. |
| 2017/0237296 A1* | 8/2017 | Keith ...................... H02J 7/025 307/104 |
| 2017/0317536 A1 | 11/2017 | Marson et al. |

OTHER PUBLICATIONS

"Examination Report," dated Mar. 7, 2020 in Government of India Application No. 201914033424. 6 pages. Includes English translation.

"Preliminary Rejection," dated Jul. 2, 2020 in Korean Patent Application No. 10-2019-0097320. 10 pages (includes English summary of Office Action).

* cited by examiner

WIRELESS CHARGING SYSTEMS FOR ELECTRONIC DEVICES

CROSS REFERENCES TO RELATED APPLICATIONS

This application claims priority to U.S. Provisional Patent Application No. 62/676,419, filed on May 25, 2018, U.S. Provisional Patent Application No. 62/720,001, filed on Aug. 20, 2018, and U.S. Provisional Patent Application No. 62/834,323, filed on Apr. 15, 2019, the disclosures of which are hereby incorporated by reference in their entirety and for all purposes.

BACKGROUND

Portable electronic devices (e.g., mobile phones, media players, electronic watches, and the like) operate when there is charge stored in their batteries. Some portable electronic devices include a rechargeable battery that can be recharged by coupling the portable electronic device to a power source through a physical connection, such as through a charging cord. Using a charging cord to charge a battery in a portable electronic device, however, requires the portable electronic device to be physically tethered to a power outlet. Additionally, using a charging cord requires the mobile device to have a connector, typically a receptacle connector, configured to mate with a connector, typically a plug connector, of the charging cord. The receptacle connector typically includes a cavity in the portable electronic device that provides an avenue within which dust and moisture can intrude and damage the device. Furthermore, a user of the portable electronic device has to physically connect the charging cable to the receptacle connector in order to charge the battery.

To avoid such shortcomings, wireless charging devices have been developed to wirelessly charge portable electronic devices without the need for a charging cord. For example, some portable electronic devices can be recharged by merely resting the device on a charging surface of a wireless charging device. A transmitter coil disposed below the charging surface may produce a time-varying magnetic flux that induces a current in a corresponding receiving coil in the portable electronic device. The induced current can be used by the portable electronic device to charge its internal battery. The receiving coil in the portable electronic device can only receive power from the wireless charging device.

SUMMARY

Some embodiments of the disclosure provide a portable electronic device that includes a hybrid wireless charging system. The hybrid wireless charging system is configured to not only receive charge from a wireless charging device, but also transmit charge to a secondary electronic device. In some embodiments, the hybrid charging system can include a hybrid receiver/transmitter coil and one or more alignment mechanisms to assist in alignment with the secondary electronic device. By incorporating a hybrid charging system in a portable electronic device, it improves functionality of the electronic device and helps the portable electronic device achieve efficient power transfer with a secondary electronic device.

In some embodiments, a portable electronic device includes a housing having an interface surface and an inductor coil disposed within the housing and comprising a conductive wire wound in a plurality of turns about a center point and in increasing radii such that the inductor coil is substantially planar. The device can further include charging circuitry coupled to the inductor coil and configured to operate the inductor coil to wirelessly receive power and wirelessly transmit power, control circuitry coupled to the charging circuitry and configured to instruct the charging circuitry to operate the inductor coil to wirelessly receive power and to wirelessly transmit power, and a device detection coil coupled to the control circuitry and configured to detect a presence of an external device on the interface surface, the device detection coil is configured to operate at a different frequency from the inductor coil.

The device detection coil can be constructed of a wire having a narrower trace width than the conductive wire used to form the inductor coil. The conductive wire can be formed of a plurality of sub-wires arranged in a single plane. The device can further include an electromagnetic shield disposed between the inductor coil and the interface surface and comprising a substrate layer and a conductive layer attached to the substrate layer, where the electromagnetic shield can be configured to intercept electric field while allowing magnetic flux to pass through. The inductor coil and the device detection coil can be attached to the electromagnetic shield. An outer profile of the device detection coil can be the same as an outer profile of the electromagnetic shield. The device detection coil can be positioned at an outer perimeter of the electromagnetic shield. The inductor coil can have a first outer profile and the device detection coil can have a second outer profile different from the inductor coil. The device detection coil can be disposed outside of an outer perimeter of the inductor coil. The device detection coil can be formed of a patterned conductive trace on a substrate, and the inductor coil can be formed of a stranded coil. The device can further include a magnetic material disposed between adjacent turns of the plurality of turns of the conductive wire. The conductive wire can be formed of a plurality of sub-wires arranged in a single plane, and the magnetic material can be further disposed between adjacent sub-wires of each turn of conductive wire.

In certain embodiments, a portable electronic device includes a housing having an interface surface, an inductor coil disposed within the housing and comprising a conductive wire wound in a plurality of turns about a center point and in increasing radii such that the inductor coil is substantially planar, and an electromagnetic shield disposed between the inductor coil and the interface surface. The electromagnetic shield can include a substrate layer and a conductive layer attached to the substrate layer and be configured to intercept electric fields while allowing magnetic flux to pass through. The device can further include an interconnection component comprising a first contact pad and a second contact pad positioned at a coupling end of the interconnection component, where the first contact pad can be configured to couple with the electromagnetic shield, and the second contact pad can be configured to couple with the inductor coil. The device can also include a device detection coil configured to detect the presence of an external device on the charging surface, where the device detection coil is configured to operate at a different frequency from the inductor coil.

The device can further include charging circuitry disposed within the housing and coupled to the inductor coil, the charging circuitry can be configured to receive current from the inductor coil. The interconnection component can include a flexible circuit and be configured to ground the electromagnetic shield and couple the inductor coil to the charging circuitry. The interconnection component can be a flexible circuit board. The coupling end can be positioned at a center of the inductor coil such that the electromagnetic shield and the inductor coil both terminate at the center of the inductor coil. The conductive wire can be formed of a stranded coil, each strand having a cross-sectional profile in the shape of a square, circle, or rectangle.

In some embodiments, a wireless charging system includes a wireless charging device comprising a transmitter coil and a portable electronic device configured to receive power from the wireless charging device. The portable electronic device can include a housing having an interface surface, and an inductor coil disposed within the housing and comprising a conductive wire wound in a plurality of turns about a center point and in increasing radii such that the inductor coil is substantially planar. The device can further include charging circuitry coupled to the inductor coil and configured to operate the inductor coil to wirelessly receive power and wirelessly transmit power, control circuitry coupled to the charging circuitry and configured to instruct the charging circuitry to operate the inductor coil to wirelessly receive power and to wirelessly transmit power, and a device detection coil coupled to the control circuitry and configured to detect a presence of an external device on the interface surface, where the device detection coil is configured to operate at a different frequency from the inductor coil.

The system can further include an electromagnetic shield disposed between the inductor coil and the interface surface and comprising a substrate layer and a conductive layer attached to the substrate layer, the electromagnetic shield being configured to intercept electric field while allowing magnetic flux to pass through. The device detection coil can be constructed of a wire having a narrower trace width than the conductive wire used to form the inductor coil.

A better understanding of the nature and advantages of embodiments of the present invention may be gained with reference to the following detailed description and the accompanying drawings.

DETAILED DESCRIPTION

Embodiments of the disclosure describe a hybrid wireless charging system for a portable electronic device. The hybrid wireless charging system can include a hybrid receiver/transmitter coil that can be operated to receive power as well as transmit power. For instance, the hybrid receiver/transmitter coil can be coupled to hybrid charging circuitry that can operate the hybrid receiver/transmitter coil to receive power when the portable electronic device is positioned on a charging surface of a wireless charging device. The hybrid charging circuitry can also operate the hybrid receiver/transmitter coil to transmit power when a secondary electronic device is positioned on a charging surface of the portable electronic device. According to some embodiments of the present disclosure, the hybrid receiver/transmitter coil can be designed to be efficient in both receiving power as well as transmitting power, which will be discussed in further detail herein. In some embodiments, the hybrid wireless charging system can further include alignment mechanisms to help align the secondary electronic device to the hybrid receiver/transmitter coil of the portable electronic device. The alignment mechanism can be a passive alignment mechanism, or an active alignment mechanism.

Accordingly, the portable electronic device can wirelessly receive power from a wireless charging device, as well as wirelessly transmit power to a secondary electronic device, thereby increasing the functionality and versatility of the portable electronic device. Aspects and features of embodiments of such a portable electronic device are discussed in further detail herein.

I. Portable Electronic Device

A portable electronic device is an electronic device that can operate without being coupled to a power grid by running on its own locally stored electrical power. The portable electronic device can be specifically designed to perform various functions for a user. In some embodiments, electronic device 100 is a consumer electronic device, such as a smart phone, tablet, laptop, and the like.

Figure 1:
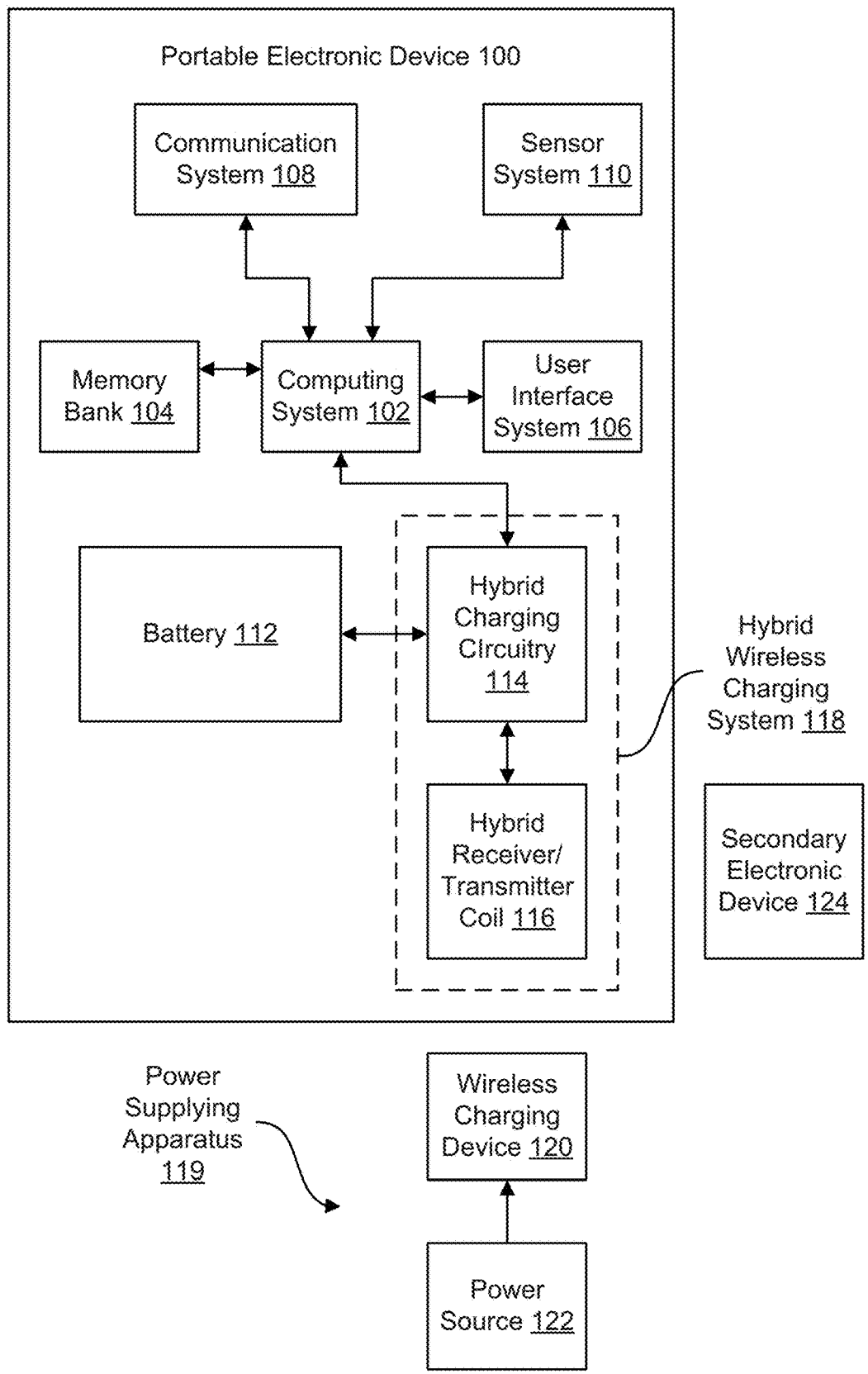
FIG. 1 is a block diagram illustrating an exemplary portable electronic device, according to some embodiments of the present disclosure.

FIG. 1 is a block diagram illustrating an exemplary portable electronic device 100, an exemplary power supplying apparatus 119 for coupling with device 100 to charge device 100, and an exemplary secondary electronic device 124 for receiving power from portable electronic device 100 according to some embodiments of the present disclosure. Device 100 includes a computing system 102 coupled to a memory bank 104. Computing system 102 can include control circuitry configured to execute instructions stored in memory bank 104 for performing a plurality of functions for operating device 100. The control circuitry can include one or more suitable computing devices, such as microprocessors, computer processing units (CPUs), graphics processing units (GPUs), field programmable gate arrays (FPGAs), and the like.

Computing system 102 can also be coupled to a user interface system 106, a communication system 108, and a sensor system 110 for enabling electronic device 100 to perform one or more functions. For instance, user interface system 106 can include a display, speaker, microphone, actuator for enabling haptic feedback, and one or more input devices such as a button, switch, capacitive screen for enabling the display to be touch sensitive, and the like. Communication system 108 can include wireless telecommunication components, Bluetooth components, and/or wireless fidelity (WiFi) components for enabling device 100 to make phone calls, interact with wireless accessories, and access the Internet. Sensor system 110 can include light sensors, accelerometers, gyroscopes, temperature sensors, and any other type of sensor that can measure a parameter of an external entity and/or environment.

All of these electrical components require a power source to operate. Accordingly, electronic device 100 also includes a battery 112 for discharging stored energy to power the electrical components of device 100. To replenish the energy discharged to power the electrical components, electronic device 100 includes a hybrid wireless charging system 118. Hybrid wireless charging system 118 can include hybrid charging circuitry 114 and hybrid receiver/transmitter coil 116 for receiving power from a wireless charging device 120 coupled to an external power source 122. Wireless charging device 120 can include a transmitter coil for generating a time-varying magnetic flux capable of generating a corresponding current in hybrid receiver/transmitter coil 116. The generated current can be utilized by hybrid charging circuitry 114 to charge battery 112. According to some embodiments of the present disclosure, hybrid wireless charging system 118 can also transmit power to secondary electronic device 124. Details of such a hybrid wireless charging system is discussed in further detail herein.

II. Hybrid Wireless Charging System

Figure 2A:
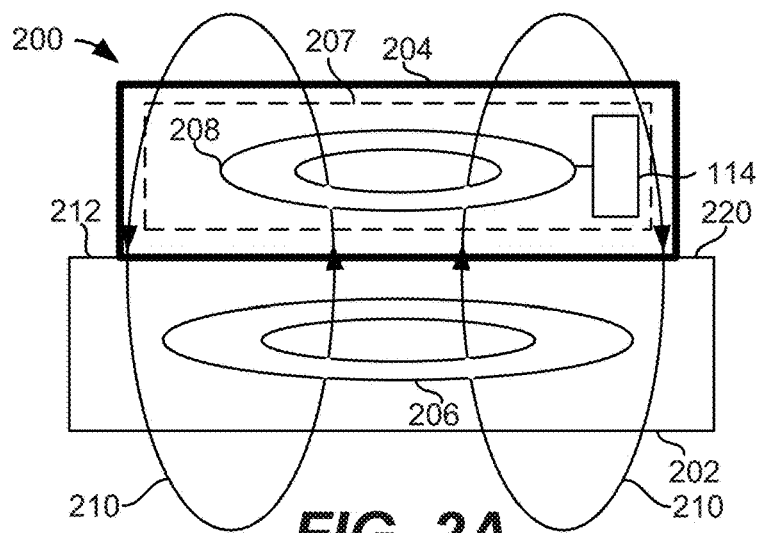
FIG. 2A is a simplified diagram illustrating electrical interactions experienced by an exemplary hybrid wireless charging system as it is receiving power from a wireless charging device, according to some embodiments of the present disclosure.
Figure 2B:
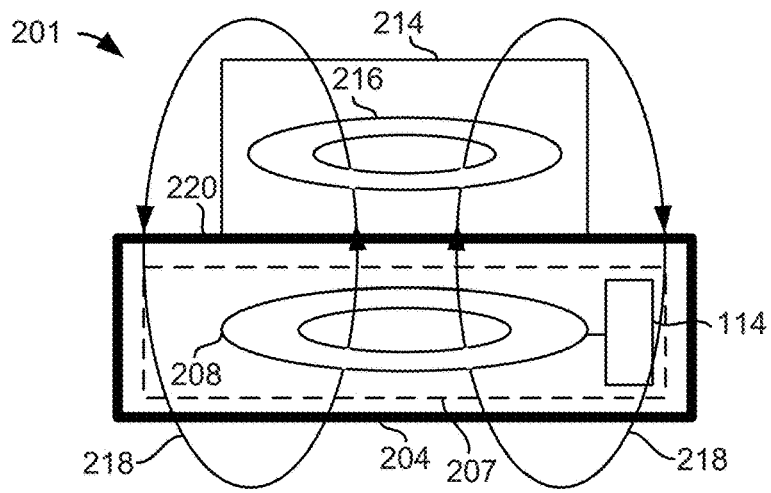
FIG. 2B is a simplified diagram illustrating electrical interactions experienced by the exemplary wireless charging system as it is transmitting power to a secondary device, according to some embodiments of the present disclosure.

Embodiments of the disclosure describe a hybrid wireless charging system that can both wirelessly receive power as well as wirelessly transmit power. FIGS. 2A and 2B illustrate an exemplary hybrid wireless charging system during wireless power transfer. Specifically, FIG. 2A illustrates the electrical interactions experienced by an exemplary hybrid wireless charging system as it is receiving power from a wireless charging device, and FIG. 2B illustrates the electrical interactions experienced by the exemplary wireless charging system as it is transmitting power to a secondary device, according to some embodiments of the present disclosure.

With reference to FIG. 2A, a portable electronic device 204 is positioned on a charging surface 212 of a wireless charging device 202. Portable electronic device 204 can include a hybrid wireless charging system 207 that has a hybrid receiver/transmitter coil 208 and hybrid charging circuitry 205; and wireless charging device 202 can include a transmitter coil 206. Hybrid receiver/transmitter coil 208 can be an inductor coil that can interact with and/or generate time-varying magnetic flux. Portable electronic device 204 can be a consumer electronic device, such as a smart phone, tablet, and the like. Wireless charging device 202 can be any suitable device configured to generate time-varying magnetic field to induce a corresponding current in a receiving device. For instance, wireless charging device 202 can be a wireless charging mat, puck, docking station, and the like. Portable electronic device 204 may rest on the wireless charging device 202 at charging surface 212 to enable power transfer.

During wireless power transfer from wireless charging device 202 to portable electronic device 204, hybrid wireless charging system 207 can operate to receive power from wireless charging device 202. For instance, hybrid charging circuitry 205 can operate hybrid receiving coil 208 as a receiving coil to receive power by interacting with time-varying magnetic flux 210 generated by transmitter coil 206. Hybrid charging circuitry 205 can correspond with hybrid charging circuitry 114 in FIG. 1. Interaction with time-varying magnetic flux 210 results in an inducement of current in hybrid receiver/transmitter coil 208, which can be used by hybrid charging circuitry 205 to charge an internal battery of portable electronic device 204. As shown in FIG. 2A, portable electronic device 204 can rest on charging surface 212 of wireless charging device 202. In some embodiments, an interface surface 220 of portable electronic device 204 makes contact with charging surface 212 during wireless power transfer. Thus, portable electronic device 204 can receive power through interface surface 220. Interface surface 220 can be an external surface of a housing of portable electronic device 204.

According to some embodiments of the present disclosure, hybrid wireless charging system 207 can also operate to transmit power to a secondary device. For instance, with reference to FIG. 2B, a secondary electronic device 214 can be positioned on a charging surface of portable electronic device 204 to receive charge from portable electronic device 204. In some embodiments, interface surface 220 is the charging surface upon which secondary electronic device 214 can receive power from portable electronic device 204. Thus, portable electronic device 204 can receive power as well as transfer power through the same surface, i.e., interface surface 220.

Secondary electronic device 214 can be an electronic device that can operate without being coupled to a power grid by running on its own locally stored electrical power. For instance, secondary electronic device 214 can be an accessory that operates with portable electronic device 204, such as a smart watch, smart phone, wireless earbuds, a case for the wireless earbuds, and the like, or it can be any other portable electronic device such as a tablet, laptop, and the like. Secondary electronic device 214 can include a secondary receiving coil 216 for receiving power during wireless power transfer.

During wireless power transfer from portable electronic device 204 to secondary electronic device 214, hybrid wireless charging system 207 can operate to transmit power to secondary electronic device 214. For instance, hybrid charging circuitry 205 can operate hybrid receiving coil 208 as a transmitter coil to generate a time-varying magnetic flux 218 to interact with secondary receiver coil 216. In some embodiments, hybrid charging circuitry 205 can drive current through hybrid receiver/transmitter coil 208 and cause hybrid receiver/transmitter coil 208 to generate time-varying magnetic flux 218 that can induce a corresponding current in secondary receiver coil 216. Current induced in secondary receiver coil 216 can be used by secondary electronic device 214 to charge its battery. In some embodiments, hybrid wireless charging system 207 can also include an alignment mechanism to help align secondary receiver coil 216 with hybrid receiver/transmitter coil 208, as will be discussed further herein.

Figure 2C:
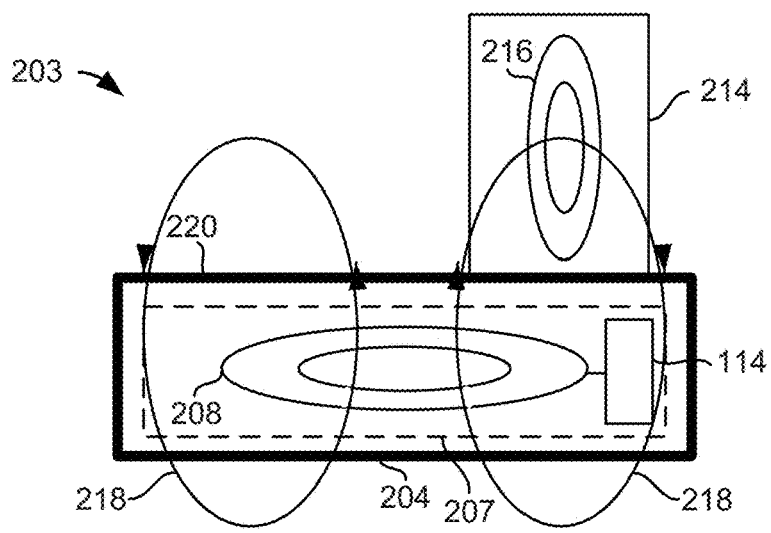
FIG. 2C is a simplified diagram illustrating electrical interactions experienced by the exemplary wireless charging system as it is transmitting power to a secondary device that is resting on its side, according to some embodiments of the present disclosure.

In some embodiments, hybrid wireless charging system 207 can also operate to transmit power to the secondary device even when it is resting on its side. In such instances, horizontal magnetic flux generated by hybrid wireless charging system 207 can be received by the secondary device. For instance, with reference to FIG. 2C, secondary electronic device 214 can be positioned on its side on the charging surface of portable electronic device 204. Hybrid receiver/transmitter coil 208 can be configured to generate flux up to a certain distance away from interface surface 220 so that horizontal components of magnetic flux 218 can be received by secondary receiver coil 216. In some embodiments, secondary receiver coil 216 can be wound around a ferromagnetic structure (not shown) to direct flux through coil 216 to improve power transfer efficiency.

Given that hybrid receiver/transmitter coil 208 can operate to receive power as well as transmit power, hybrid charging circuitry 205 can include circuitry suitable for enabling these operations. As an example, hybrid charging circuitry 205 can include power receiving circuitry that can receive induced current from hybrid receiver/transmitter coil 208 and convert the received power (typically alternating current (AC) power) to usable power (e.g., direct current (DC) power). Hybrid charging circuitry can also include power transmitting circuitry that can drive current into hybrid receiver/transmitter coil 208 and cause hybrid receiver/transmitter coil 208 to generate time-varying magnetic flux. In some embodiments, hybrid charging circuitry 205 can also include a switching mechanism for coupling hybrid receiver/transmitter coil 208 to either the power receiving circuitry or the power transmitting circuitry, but not both at the same time, to operate hybrid receiver/transmitter coil 208 accordingly. For instance, hybrid charging circuitry 205 can include a multiplexer for coupling hybrid receiver/transmitter coil 208 to either the power receiving circuitry or the power transmitting circuitry. The switching mechanism can be coupled between hybrid receiver/transmitter coil 208 and both the power receiving circuitry and the power transmitting circuitry.

III. Architecture and Construction of Hybrid Wireless Charging Systems

The structural construction of a hybrid receiver/transmitter coil can be arranged so that it is substantially effective at both receiving and transmitting power. Furthermore, the assembly of the hybrid receiver/transmitter coil within a portable electronic device can be specifically designed to complement the receiving and transmitting capabilities of the hybrid receiver/transmitter coil. In some embodiments, the hybrid receiver/transmitter coil can be formed in a variety of ways. For instance, the hybrid receiver/transmitter coil can be formed of a conductive winding of material arranged in a plurality of turns wound about a center point and in increasing radii such that the hybrid receiver/transmitter coil is substantially planar. The conductive winding can be formed as a flexible printed circuit (FPC) coil or as a stranded coil, as will be discussed further herein.

A. Flexible Printed Circuit Coil

Figure 3A:
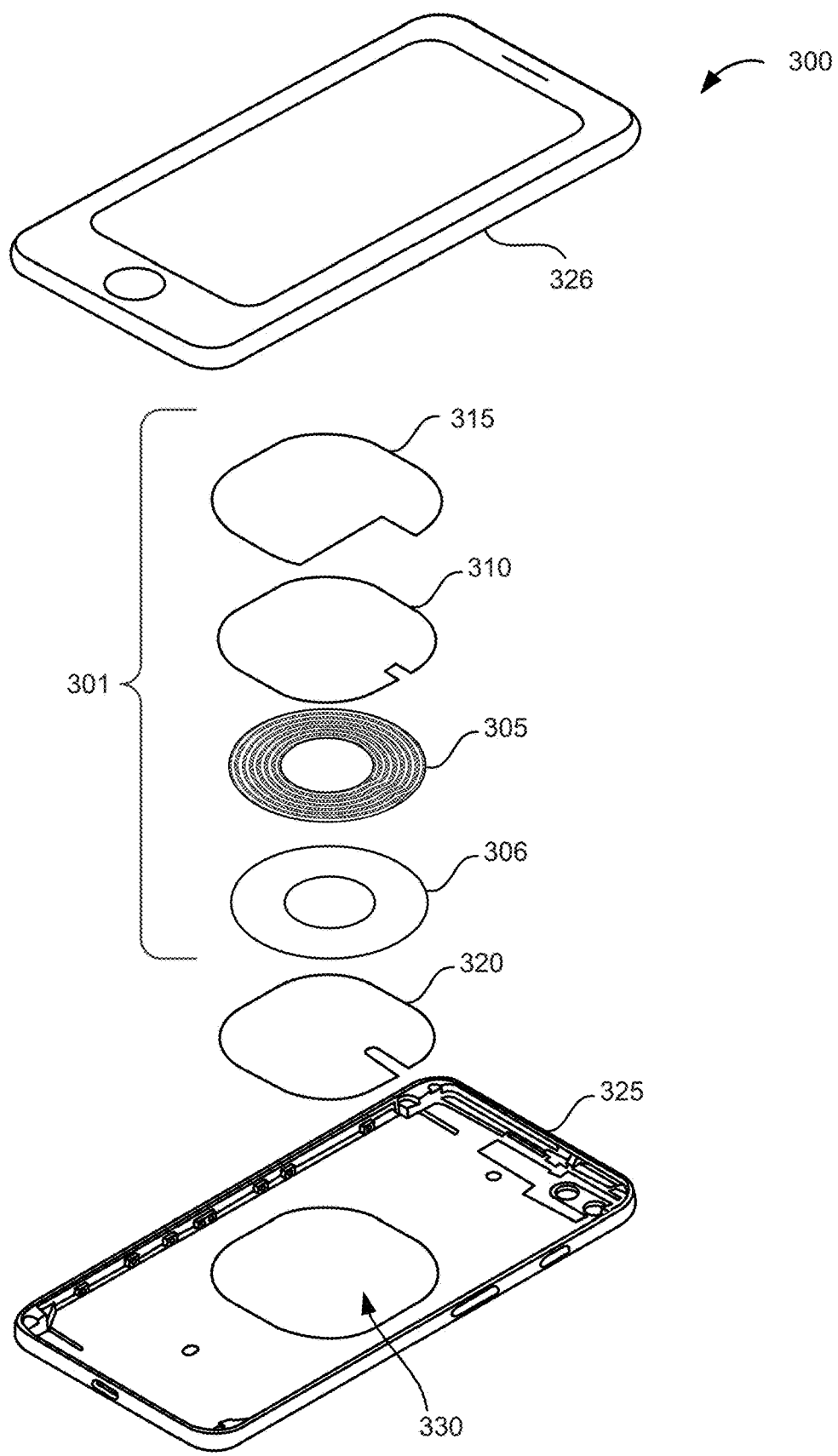
FIG. 3A is a simplified diagram illustrating an exploded view of a portable electronic device including a hybrid receiver/transmitter coil formed as a flexible printed circuit (FPC) coil, according to some embodiments of the disclosure.

FIG. 3A illustrates an exploded view of a portable electronic device 300 including a hybrid receiver/transmitter coil 305 formed as a FPC coil, according to some embodiments of the disclosure. Portable electronic device 300 can include a top housing 326 and a housing 325 that can mate to define an interior cavity. As shown in FIG. 3A, portable electronic device 300 can include at least three separate shields: an electromagnetic shield 306, a ferromagnetic shield 310, and a thermal shield 315 along with an adhesive component 320 that attaches wireless power receiving/transmitting module 301 to housing 325.

Electromagnetic shield 306 can be positioned in front of hybrid receiver/transmitter coil 305 so that magnetic flux first passes through electromagnetic shield 306 before reaching hybrid receiver/transmitter coil 305 when hybrid receiver/transmitter coil 305 operates as a receiver coil, or so that magnetic flux is directed toward electromagnetic shield 306 when hybrid receiver/transmitter coil 305 operates as a transmitter coil. For instance, electromagnetic shield 306 can be positioned between hybrid receiver/transmitter coil 305 and housing 325. In some embodiments, electromagnetic shield 306 can be a shielding layer that is substantially transparent to magnetic flux so that a large percentage of magnetic flux can pass through it, but also be substantially opaque to electric field such that electric field generated by hybrid receiver/transmitter coil 305 or a transmitter coil in a wireless charging device during operation is substantially blocked by it. Voltage generated in electromagnetic shield 306 by blocking the electric fields can be discharged to ground. Blocking electric fields mitigates noise stemming from a buildup of voltage on hybrid receiver/transmitter coil 305. In some embodiments, electromagnetic shield 306 is formed of any material suitable for blocking electric fields while allowing electromagnetic fields to pass through, such as a thin layer of silver.

Ferromagnetic shield 310 can be positioned between hybrid receiver/transmitter coil 305 and thermal shield 315. In some embodiments, ferromagnetic shield 310 acts as a magnetic field shield for redirecting magnetic flux to get higher coupling with a transmitter coil in a wireless charging device, which can result in improved charging efficiency. Ferromagnetic shield 310 can also redirect magnetic flux to prevent stray flux from interfering with sensitive internal components within portable electronic device 300.

Thermal shield 315 can include a graphite or similar layer that provides thermal isolation between wireless power receiving/transmitting module 301 and the battery and other components of portable electronic device 300 in which the wireless power receiving/transmitting module 301 is incorporated. Thermal shield 315 can also include a copper layer that is tied to ground and contributes to the thermal shielding while also capturing stray flux.

Adhesive component 320 can be a single sheet of an adhesive material, such as pressure sensitive adhesive (PSA), that attaches wireless power receiving/transmitting module 301 to housing 325. In some embodiments, wireless power receiving/transmitting module 301 is attached to housing 325 within a cutout area 330 sized and shaped to receive the wireless power receiving/transmitting module 301, thereby saving space within the electronic device to minimize the thickness of portable electronic device 300. Instead of being attached to housing 325 with a single sheet of adhesive material, wireless power receiving/transmitting module 301 can be attached to housing 325 with an attachment assembly that is composed of more than one sheet of adhesive material, as discussed herein with respect to FIGS. 3B and 3C.

Figure 3B:
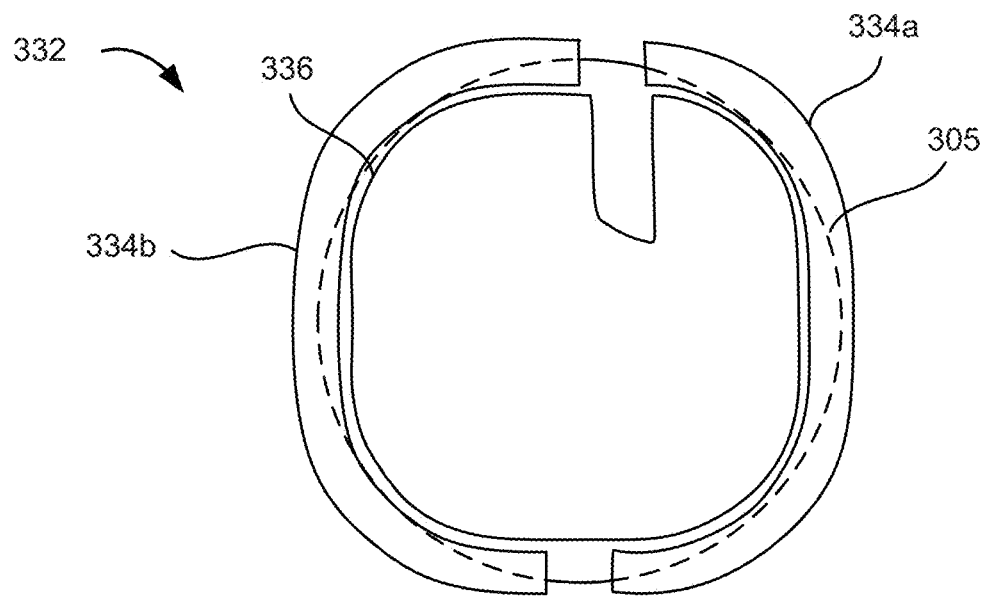
FIG. 3B is a simplified diagram illustrating an exemplary attachment assembly composed of a sheet of single-sided adhesive and double-sided adhesives positioned at edges of a hybrid receiver/transmitter coil in an overlapping arrangement, according to some embodiments of the present disclosure.

FIG. 3B illustrates an exemplary attachment assembly 332 composed of a sheet of single-sided adhesive 336 and double-sided adhesives 334a and 334b positioned at edges of hybrid receiver/transmitter coil 305 in an overlapping arrangement, according to some embodiments of the present disclosure. Double-sided adhesives 334a and 334b can be formed of PSA to attach thermal shield 315 to housing 325. Single-sided adhesive 336 can be attached to housing 325 and act as an anti-splinter film in case of a breakage event. In particular embodiments, single-sided adhesive 336 may not be coupled to portable electronic device 300 so that ferromagnetic shield 310 and hybrid receiver/transmitter coil 305 are decoupled from housing 325. By decoupling ferromagnetic shield 310 and hybrid receiver/transmitter coil 305 from housing 325, vibrations caused by time-varying magnetic fields generated during wireless power transfer may not be transferred to housing 325, thereby minimizing acoustic coupling between ferromagnetic shield 310 and hybrid receiver/transmitter coil 305 from housing 325. In some embodiments, single-sided adhesive 336 is formed of polyimide. As shown in FIG. 3B, double-sided adhesives 334a and 334b can be positioned around the perimeter of hybrid receiver/transmitter coil 305. In some instances, double-sided adhesives 334a and 334b can overlap edges of hybrid receiver/transmitter coil 305, as indicated by the relative position of the dotted profile of hybrid receiver/transmitter coil 305.

Figure 3C:
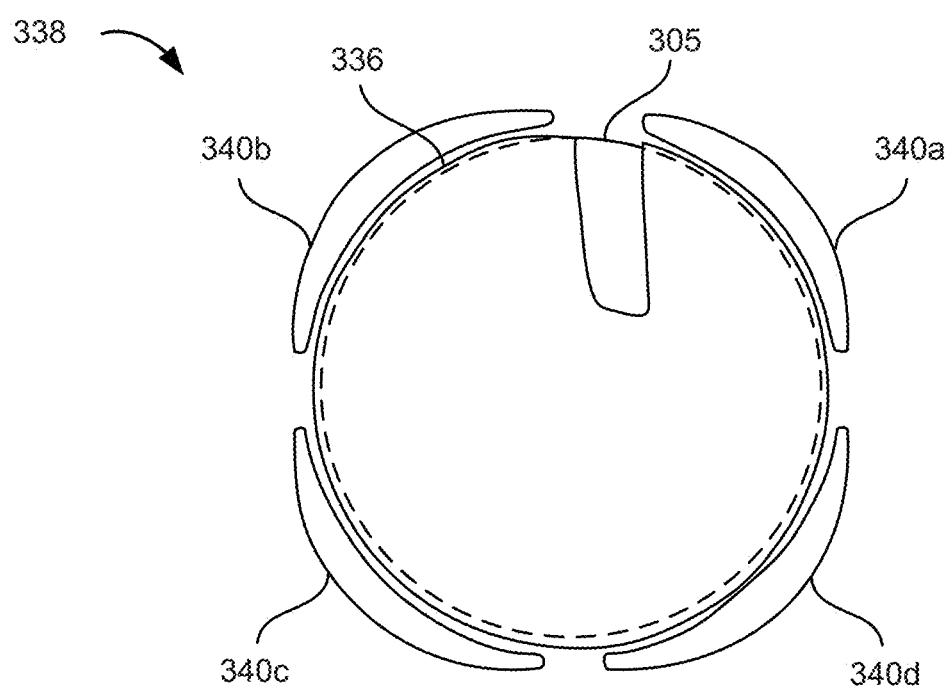
FIG. 3C is a simplified diagram illustrating an exemplary attachment assembly where double-sided adhesives are crescent-shaped and do not overlap with edges of the hybrid receiver/transmitter coil, according to some embodiments of the present disclosure.

Although FIG. 3B illustrates attachment assembly 340 as having double-sided adhesives 334a and 334b positioned around the perimeter of hybrid receiver/transmitter coil 305 in such a way that overlaps with edges of hybrid receiver/transmitter coil 305, embodiments are not so limited. Other attachment assemblies have double-sided adhesives that do not overlap with edges of hybrid receiver/transmitter coil 305. FIG. 3C illustrates an exemplary attachment assembly 338 where double-sided adhesives 340a-d are crescent-shaped and do not overlap with edges of hybrid receiver/transmitter coil 305, according to some embodiments of the present disclosure. Double-sided adhesives 340a-d are shaped as a crescent to conform to the outer profile of hybrid receiver/transmitter coil 305. Double-sided adhesives 340a-d attach ferromagnetic shield 310 to housing 325 without overlapping with hybrid receiver/transmitter coil 305. In some embodiments, single-sided adhesive 336 can have a shape that corresponds with the shape of hybrid receiver/transmitter coil 305. For instance, single-sided adhesive 336 can be substantially circular.

With reference back to FIG. 3A, hybrid receiver/transmitter coil 305 can be disposed between electromagnetic shield 306 and ferromagnetic shield 310. In some embodiments, hybrid receiver/transmitter coil 305 can be operated to generate time-varying magnetic flux to transmit power to a secondary device. The generated time-varying magnetic flux can pass through electromagnetic shield 306 to charge the secondary device but be redirected by ferromagnetic shield 310 to prevent stray magnetic flux from interference with other components in portable electronic device 300. Hybrid receiver/transmitter coil 305 can also be operated to receive power from time-varying magnetic flux generated by a transmitter coil in a wireless charging device. The time-varying magnetic flux can first pass through electromagnetic shield 306 before exposing on hybrid receiver/transmitter coil 305 and be redirected by ferromagnetic shield 310 to get higher coupling with the transmitter coil.

Figure 4A:
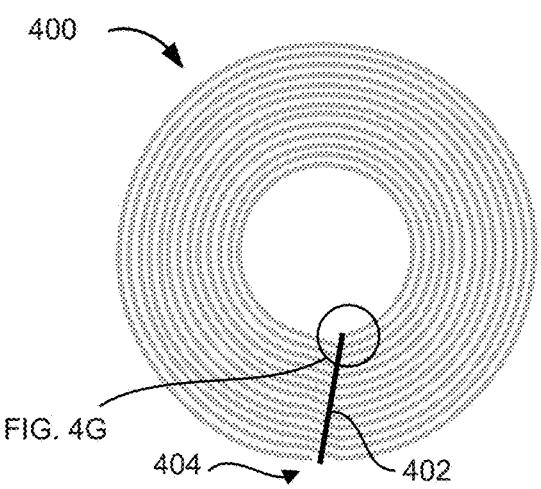
FIGS. 4A-4J are simplified diagrams illustrating different hybrid receiver/transmitter coil constructions that are suitable for receiving power and transmitting power, according to some embodiments of the present disclosure.

FIGS. 4A-4E illustrate simplified diagrams of different hybrid receiver/transmitter coil constructions that are suitable for receiving power and transmitting power, according to some embodiments. FIG. 4A illustrates an exemplary hybrid receiver/transmitter coil 400 configured as a spirally wound FPC coil, according to some embodiments of the present disclosure. Coil 400 can wind from an inner diameter to an outer diameter in a spiral configuration such that the overall shape is similar to a planar inductor coil that is formed of a plurality of turns of patterned wire on a flexible substrate. A termination end positioned in the inner diameter of coil 400 can be routed to an outer diameter bay way of a conductive trace 402. Accordingly, charging circuitry, such as hybrid charging circuitry 114 in FIG. 1, can couple with coil 400 at one edge location 404 to operate coil 400 to transmit or receive power.

Figure 4B:
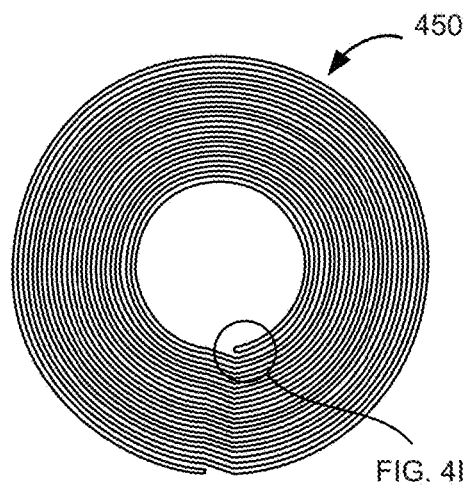

The cross-sectional width of the wire used to form coil 400 and the gap between adjacent turns of coil 400 can be specifically tuned to achieve a sufficient degree of efficiency during charging. For instance, each turn of wire in coil 400 can have a cross-section that is a single structure having a certain width and can be separated from adjacent turns by a certain distance. This is better shown in FIGS. 4G-4H. FIG. 4G is a close-up top-down illustration of a portion 460 of coil 400, according to some embodiments of the present disclosure. As shown, coil 400 can include a plurality of turns including first and second turns 462 and 464 that form part of a spirally wound planar coil that begins from a first termination end 466 and winds outward in a planar configuration until a second termination end (not shown in FIG. 4G but can be seen in FIG. 4A where the coil ends at the outer perimeter of coil 400). FIG. 4H is a cross-sectional view of turns 462 and 464 of coil 400, according to some embodiments of the present disclosure. Each turn can be a single structure with a certain width 468 separated from an adjacent turn by a separation distance 469 that are both tailored to achieve a target direct current resistance (DCR) and alternating current resistance (ACR) that is within design specifications to achieve efficient wireless power transfer. For instance, each turn can have a width 468 between 0.7 to 0.9 mm, particularly approximately 0.8 mm in some embodiments. And, each turn can be separated from adjacent turns by a separation distance 469 of between 0.25 to 0.45, particularly around 0.34 mm in some embodiments. This configuration can result in a cross-sectional area per turn of between 0.05 to 0.06 mm$^2$, such as approximately 0.056 mm$^2$ in some embodiments While each turn can be a single structure in some instances, embodiments are not limited to such configurations. Other embodiments can have more structures per turn. For instance, FIG. 4B is a top-down view of an exemplary hybrid receiver/transmitter coil 450 configured as a spirally wound FPC coil where each turn includes two structures, according to some embodiments of the present disclosure. Each pair of structures can be electrically coupled together such that the pair of structures functions as a single conductive path for a turn of wire. In order for the pair of structures to be coupled together, the pair of structures can be coupled together at each termination end of the wire. This can be better understood with reference to FIGS. 4I-4J FIG. 4I is a close-up top-down illustration of a portion 470 of coil 450 in FIG. 4B, according to some embodiments of the present disclosure. As shown, coil 450 can include a plurality of turns including first and second turns 472 and 474 that form part of a spirally wound planar coil that begins from a first termination end 476 and winds outward in a planar configuration until a second termination end (not shown in FIG. 4I but can be seen in FIG. 4B where the coil ends at the outer perimeter of coil 450).

Termination end 476 can include a bridging portion 482 that couples the two structures together for each turn. That way, while each turn is formed of two structures, both can act as a single conductive path through which current flows. Bridging portion 482 can be a portion of the patterned wire that forms each turn such that the wire and the bridging portion 482 a part of a monolithic structure. That is, coil 450 can be a patterned, deposited coil that is a planar coil that winds radially outward from a central axis in a planar fashion, where each turn of coil 450 includes two structures that are coupled together physically and electrically via bridging portions. In some embodiments, bridging portion 482 is positioned at the termination ends of coil 450, i.e., at the points where the monolithic structure of coil 450 physically ends. Thus, coil 450 can have two bridging portions, bridging portion 482 positioned within an inner diameter of coil 450, and an outer bridging portion (not shown, but can be seen in FIG. 4F) positioned at an outer edge of coil 450.

FIG. 4J is a cross-sectional view of turns 472 and 474 of coil 450, according to some embodiments of the present disclosure. Each turn can include two structures: first structure 475 and second structure 477. Each structure can have a rectangular cross-sectional profile as shown in FIG. 4J, or any other suitable profile such as a square, circular, ovular, or trapezoidal profile. The rectangular profile can efficiently utilize the space available for each turn of wire. Both first and second structures 475 and 477 can be electrically coupled together by bridging portion 482 shown in FIG. 4I. Each structure 475 and 477 of each turn 472 and 474 of wire can have a certain width 478 and 480 and be separated by a structure separation distance 473, and each turn can be separated from an adjacent turn by a turn separation distance 479, all of which can be tailored to achieve a target DCR and ACR that is within design specifications to achieve efficient wireless power transfer. For instance, each turn can have a width 468 between 0.35 to 0.45 mm, particularly approximately 0.41 mm in some embodiments. And, each turn can be separated from adjacent turns by separation distance 469 of between 0.1 to 0.2, particularly around 0.16 mm in some embodiments. Each turn of coil 450 can also have a substantially similar cross sectional area per turn to coil 400, which can be between 0.05 to 0.06 mm$^2$, such as approximately 0.057 mm$^2$ in some embodiments. Utilizing two or more separate structures instead of one can achieve better charging efficiency while having substantially the same DCR as a coil with only one structure per turn (e.g., coil 400).

In some embodiments, coil 400 is a single-layered spirally wound coil; however, other embodiments are not so limited. In some instances, coil 400 can be a dual-layered spirally wound coil. For example, the entirety of coil 400 can be dual-layered so that each turn shown in FIG. 4A represents two layers of coils. Having additional layers throughout the entirety of coil 400 can increase the strength of magnetic field generated by coil 400, as well as increase the ability of coil 400 to receive power from a time-varying magnetic field.

Although FIG. 4A illustrates coil 400 as being either entirely single-layered, or dual-layered, embodiments are not so limited. Some coils can have portions of turns that are single-layered and some turns that are dual-layered. For instance, FIG. 4B illustrates exemplary hybrid receiver/transmitter coil 410 configured as a spirally wound coil that includes a single-layered portion 412 and a dual-layered portion 414, according to some embodiments of the present disclosure. Having different portions with different numbers of layers can alter the strength profile of time-varying magnetic flux generated by hybrid transmitter coil 410. For instance, magnetic flux generated by regions of single-layered portion 412 may not be as strong as magnetic flux generated by regions of dual-layered portion 414. The size of each region may be configured to correspond with sizes of receiver coils in different secondary electronic devices to maximize efficiency of power transfer to those secondary electronic devices. Additionally, the size of each region may be configured to correspond with sizes of transmitter coils in different wireless charging devices to maximize efficiency of power transfer from those wireless charging devices.

Figure 4C:
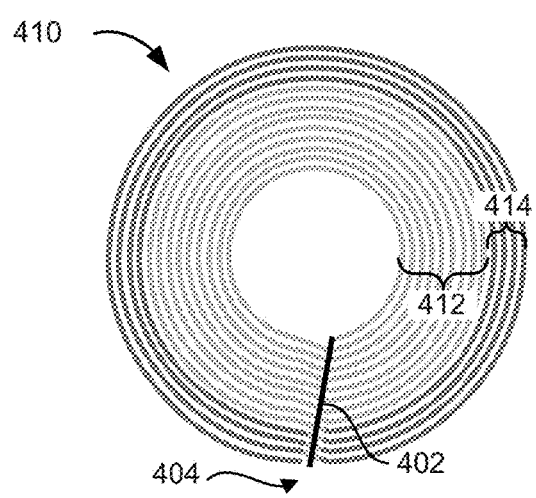

FIG. 4C illustrates an exemplary hybrid receiver/transmitter coil 420 arranged in a bimodal configuration, according to some embodiments of the present disclosure. In a bimodal configuration, hybrid receiver/transmitter coil 420 can include more than one inductor coil. For instance, hybrid receiver/transmitter coil 420 can include a first coil 422 and a second coil 424 interwound within a region of first coil 422 in a concentric manner, as shown in FIG. 4C. Each coil can be operated independently from one another so that first coil 422 can operate to transmit power while second coil 424 is turned off, and vice versa. In some embodiments, first coil 422 and second coil 424 of hybrid receiver/transmitter coil 420 can each be optimized for different charging scenarios or different secondary electronic devices. For instance, first coil 422 can be optimized to transmit power to (or receive power from) devices that operate at a first frequency or have a receiver coil of a first size corresponding to the size of first coil 422; and, second coil 424 can be optimized to transmit power to (or receive power from) devices that operate at a second frequency or have a receiver coil of a second size corresponding to the size of second coil 424. The inner termination end of first coil 422 can couple to charging circuitry through conductive trace 402, while its outer termination end can couple with charging circuitry without the need for an additional conductive trace. However, both termination ends of second coil 424 can couple with charging circuitry through conductive traces 426 and 428. Accordingly, charging circuitry, such as hybrid charging circuitry 114 in FIG. 1, can couple with hybrid receiver/transmitter coil 420 at one edge location 404 to operate both coils 422 and 424 of hybrid receiver/transmitter coil 420 to transmit or receive power.

Figure 4D:
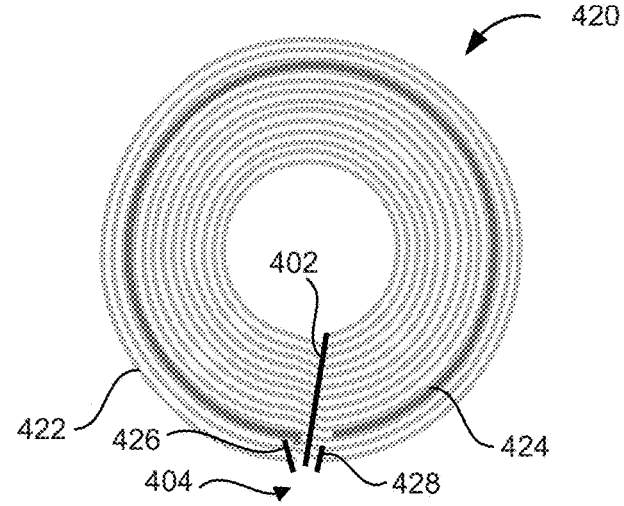

FIG. 4D illustrates an exemplary hybrid receiver/transmitter coil 430 arranged in a symmetrical coil configuration, according to some embodiments of the present disclosure. Hybrid receiver/transmitter coil 430 can begin and end at edge location 404 and have crossing-over portions 432 and 434 that allow hybrid receiver/transmitter coil 430 to be symmetrical across a vertical and horizontal axis. The symmetrical profile results in a decrease in capacitive coupling between hybrid receiver/transmitter coil 430 and a transmitter coil form which it receives power during wireless power transfer, or a receiver coil to which it transmits power.

Figure 4E:
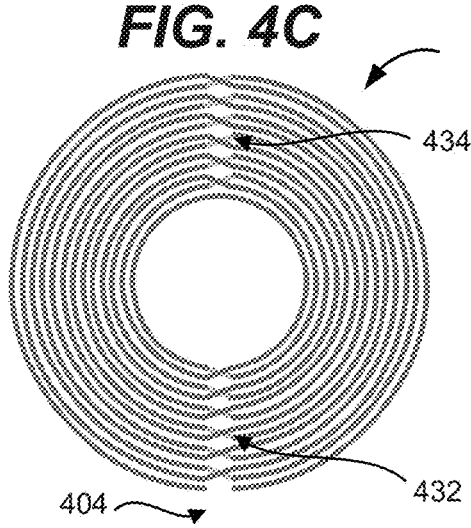
Figure 4F:
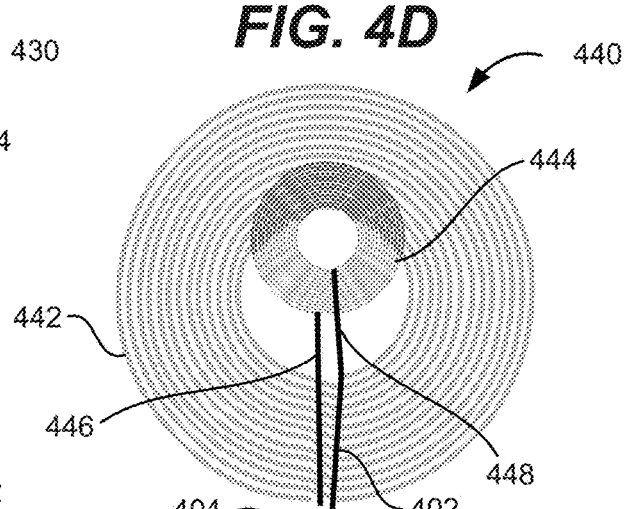
Figure 4G:
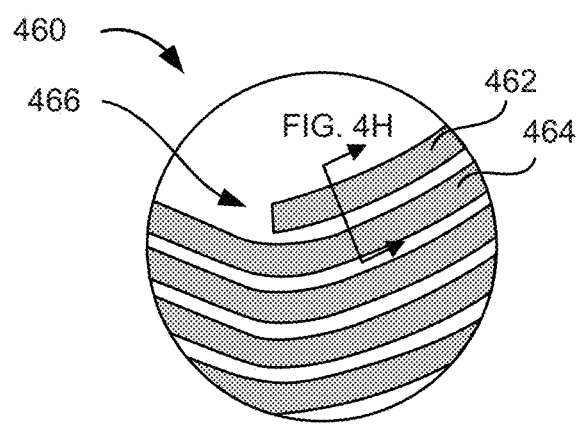
Figure 4H:
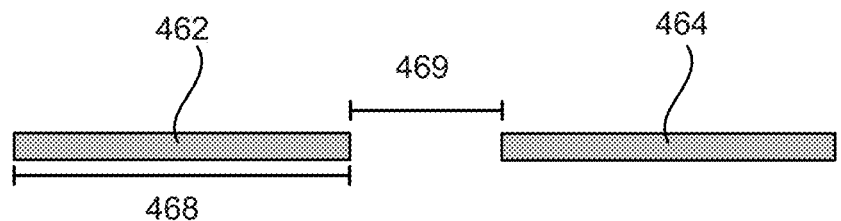
Figure 4I:
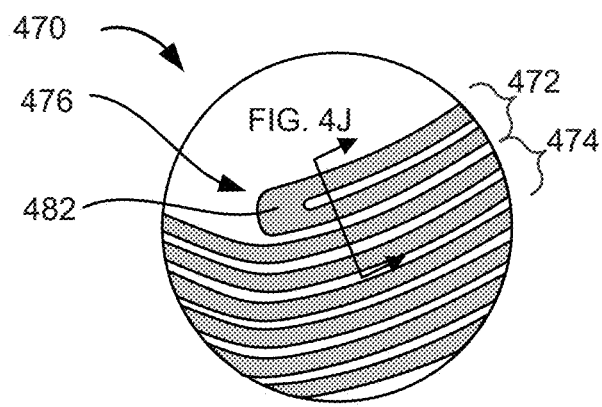
Figure 4J:
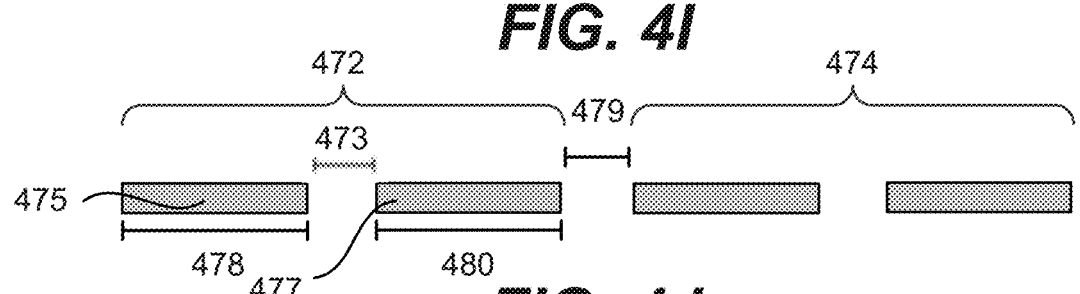

FIG. 4E illustrates an exemplary hybrid receiver/transmitter coil 440 arranged in an offset coil configuration, according to some embodiments of the present disclosure. In the offset coil configuration, hybrid receiver/transmitter coil 440 can include two inductor coils: a first inductor coil 442 and a second inductor coil 444. Unlike hybrid receiver/transmitter coil 420 in FIG. 4C, both coils 442 and 444 are not concentric. Rather, second inductor coil 444 is offset from the central axis of first inductor coil 442. Offsetting second inductor coil 444 from the center of first inductor coil 442 allows second inductor coil 444 to provide magnetic flux propagating in the horizontal direction across the center of hybrid receiver/transmitter coil 440. This allows secondary electronic devices that are configured to receive horizontal magnetic flux to receive power from second inductor coil 444 even though it is positioned at the center of (i.e., aligned with) hybrid receiver/transmitter coil 440. In some embodiments, first inductor coil 442 can be configured to receive and/or transmit power, while second inductor coil 444 is configured to only transmit power. In some embodiments, second inductor coil 444 can couple to charging circuitry through conductive trances 446 and 448, where conductive trace 448 is coupled to conductive trace 402. Thus, conductive trace 402 can be used to couple both first and second inductor coils 442 and 444 to charging circuitry.

As shown in FIG. 4E, first and second inductor coils 442 and 444 can be formed of different sizes. For instance, the inner and outer diameters of second inductor coil 444 can be smaller than the inner and outer diameters of first inductor coil 442. Furthermore, second inductor coil 444 can be formed of a winding of conductive material that has a different thickness and width than a winding of conductive material of first inductor coil 442. The different sizes and thicknesses can be configured to correspond with receiver coils of a secondary electronic device to which hybrid receiver/transmitter coil 440 transmits power, and with transmitter coils of a wireless charging device from which hybrid receiver/transmitter coil 440 receives power. It is to be appreciated that while coils 400, 410, 420, 430, 440, and 450 are exemplary hybrid receiver/transmitter coils, other embodiments can utilize these coils as strictly receiver coils or strictly transmitter coils and that embodiments are not limited to hybrid receiver/transmitter coils only.

Figure 5:
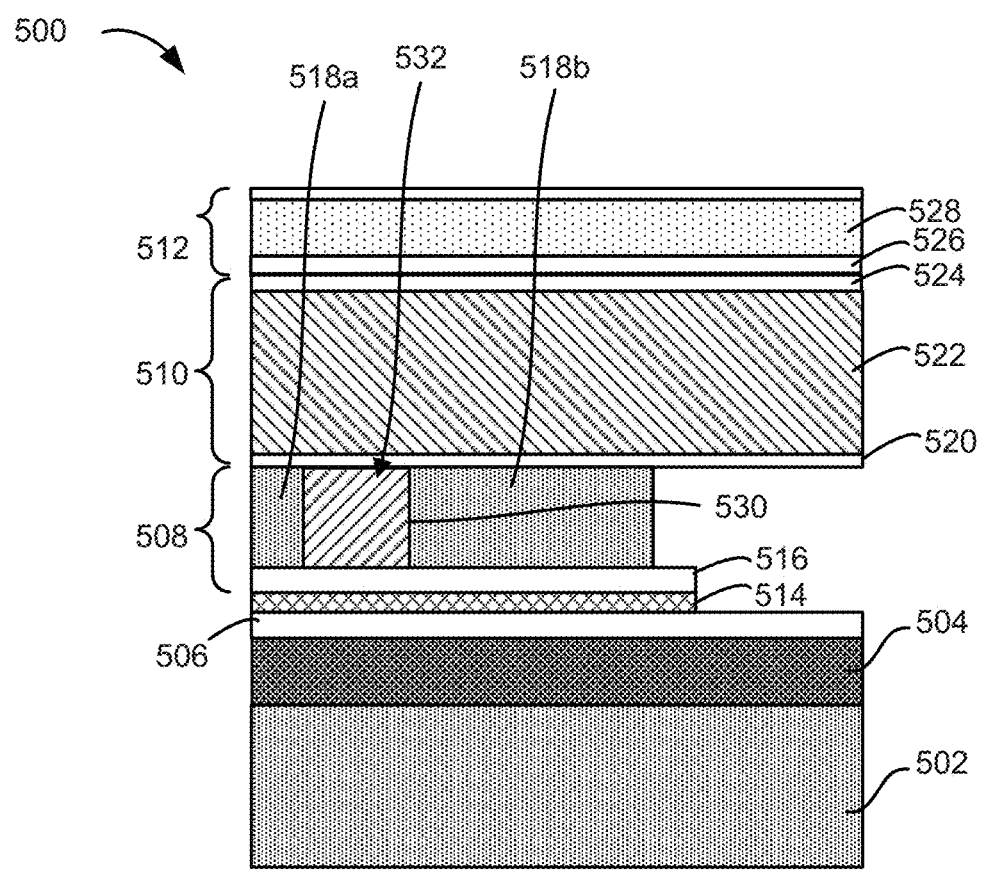
FIG. 5 is a simplified cross-sectional view of a portion of a wireless power receiving/transmitting module including a hybrid receiver/transmitter coil formed as a FPC and positioned within a housing of a portable electronic device, according to some embodiments of the present disclosure.

Reference is now made to FIG. 5, which is a simplified cross-sectional view of a portion of a wireless power receiving/transmitting module 500 including a hybrid receiver/transmitter coil 508 formed as a FPC and positioned within a housing of a portable electronic device, according to some embodiments of the present disclosure. Wireless power receiving/transmitting module 500 can include, for example, wireless power receiving/transmitting module 301 shown in FIG. 3A. As shown in FIG. 5, the portable electronic device can include a glass plate 502 having a layer of ink 504 coated on the inside surface of glass plate 502. Glass plate 502 can be attached to a housing of the portable electronic device to form a back surface of the portable electronic device. In some embodiments ink layer 504 has low electrical conductivity and the color of the ink layer can be chosen to match other exterior surfaces of the portable electronic device.

As shown, wireless power receiving/transmitting module 500 can include three separate shields including an electromagnetic shield 514, a ferromagnetic shield 510, and a thermal shield 512. Electromagnetic shield 514 can be representative of electromagnetic shield 306 shown in FIG. 3A; ferromagnetic shield 510 can be representative of ferromagnetic shield 310 and thermal shield 512 can be representative of thermal shield 315. An adhesive 506, such as a pressure sensitive adhesive, can attach module 500 to ink-coated glass layer 502/504 and act as an anti-splinter film in case of a breakage event.

Ferromagnetic shield 510 includes a relatively thick layer of ferrite material 522 sandwiched between a thin adhesive layer 520 and a thin thermoplastic polymer layer 524, such as a PolyEthylene Terephthalate film. Adhesive layer 520 and thermoplastic polymer layer 524 provide a carrier for ferrite layer 522 that contains the ferrite and prevents minor cracks, burrs or other imperfections at the ferrite surface from coming into contact with other components of the wireless power receiving/transmitting module. Ferromagnetic shield 510 is positioned within wireless power receiving/transmitting module 500 on the opposite side of conductive coil 518 as electromagnetic shield 514.

Thermal shield 512 can include a thermal layer 528 adhered to a conductive layer 526 by a thin conductive adhesive (not shown). Thermal layer 528 provides thermal isolation between wireless power receiving/transmitting module 500 and various components of the portable electronic device. Conductive layer 526 provides additional thermal shielding and can be coupled to ground to capture stray flux and prevent such flux from interfering with the display (not shown) or other components of the portable electronic device.

As shown in FIG. 5, wireless power receiving/transmitting module 500 can also include a hybrid receiver/transmitter coil 508 that can be operated to receive or transmit power, according to some embodiments of the present disclosure. Hybrid receiver/transmitter coil 508 can include a flexible dielectric base layer 516, such as a polyimide layer. In some embodiments, electromagnetic shield 514 can be formed directly on one side of polyimide layer 516 and a conductive coil 518 can be formed directly on the opposing side. Having electromagnetic shield 514 and conductive coil 518 formed directly on opposing sides of base layer 516 allows a single carrier layer to be used for both the receiver shield and receiver coil and thus enables the overall thickness of wireless power receiving/transmitting module 500 to be reduced. To further reduce thickness, some embodiments of the disclosure do not include a coverlay or other type of protective layer over the flex as is used for traditional flex circuits to encapsulate and protect the circuits formed on the flex. Instead, some embodiments of the disclosure plate the conductive coil 518 with an electroless nickel plating process followed by and a thin layer of immersion gold that protects the nickel from oxidation.

In some embodiments, conductive coil 518 can be formed of a single length of patterned conductive trace that is wound into a plurality of turns including turns 518a and 518b. The conductive trace can be wound about a center point and in increasing radii such that the resulting coil is substantially planar. As further shown in FIG. 5, each turn is separated by a gap 532 that separates adjacent turns 518a and 518b of conductive coil 518. Often times, the coil width-to-gap ratio in conventional receiver coils is selected to maximize the size of the receiver coil and to achieve the greatest wire width that the receiver can fit in its allotted space. According to some embodiments, however, the coil width-to-gap ratio is not selected to maximize the size of conductive coil 518 or to achieve the greatest wire width. Rather, the coil width-to-gap ratio can be tailored to maximize efficiency according to an operating frequency used during wireless power transfer. Higher operating frequencies tend to work better with coils having smaller wire widths. Thus, in some embodiments, the wire width-to-gap ratio can vary between 60:40 to 80:20, particularly 70:30 in some instances for an operating frequency of approximately 130 kHz. In some embodiments, gaps 532 can be filled with a magnetic material 530 to help induce magnetic flux to propagate through hybrid receiver/transmitter coil 508. Magnetic material 530 can be a ferrite material formed of a glue-based material that has magnetic properties for redirecting magnetic flux through conductive coil 518. In some instances, magnetic material 530 completely fills the space between adjacent turns 518a and 518b of conductive coil 518 and between ferrite layer 522 and electromagnetic shield 514, as shown in FIG. 5. Although conductive coil 518 is shown to have a single cross-sectional structure, it is to be appreciated that other embodiments can have conductive coil 518 formed to include multiple cross-sectional structures, as discussed herein with respect to FIG. 4J. In such instances, magnetic material 530 can also fill in regions between the structures of each turn, such as within the gap created by the structure separation distance, e.g., structure separation distance 473 in FIG. 4J.

As mentioned herein, a hybrid receiver/transmitter coil in a portable electronic device can not only receive power, but also transmit power. Power can be transmitted to a secondary electronic device when the secondary electronic device is placed against a charging surface of the portable electronic device. Often times however, a secondary electronic device is not positioned anywhere near a charging surface of the portable electronic device. Thus, the hybrid receiver/transmitter coil should not be generating magnetic flux for transmitting power. In some embodiments of the present disclosure, a device detection coil can be implemented in the hybrid wireless charging system, as will be discussed herein with respect to FIGS. 6A-6C.

Figure 6A:
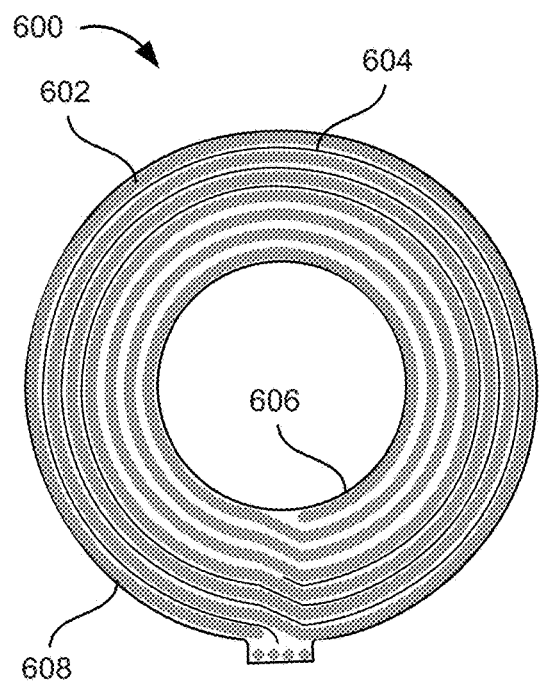
FIG. 6A is a simplified diagram illustrating an exemplary hybrid wireless charging system that includes a hybrid receiver/transmitter coil and a device detection coil in an interwound configuration, according to some embodiments of the present disclosure.
Figure 6B:
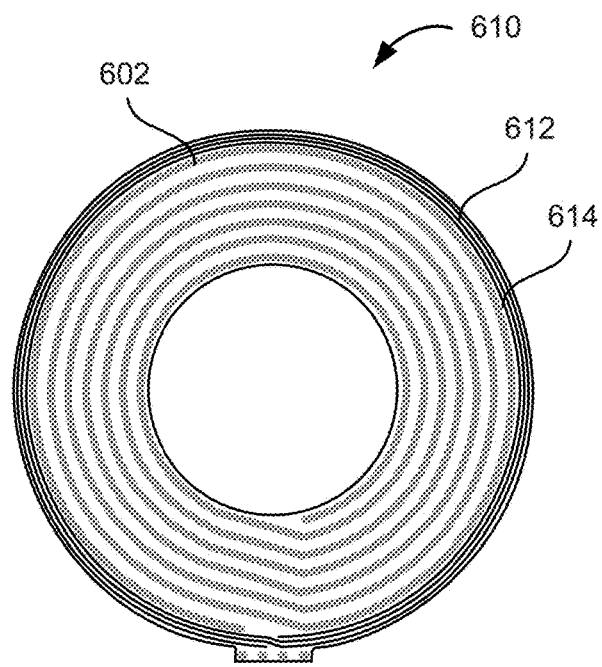
FIG. 6B is a simplified diagram illustrating an exemplary hybrid wireless charging system including a device detection coil in an outer-wound configuration, according to some embodiments of the present disclosure.
Figure 6C:
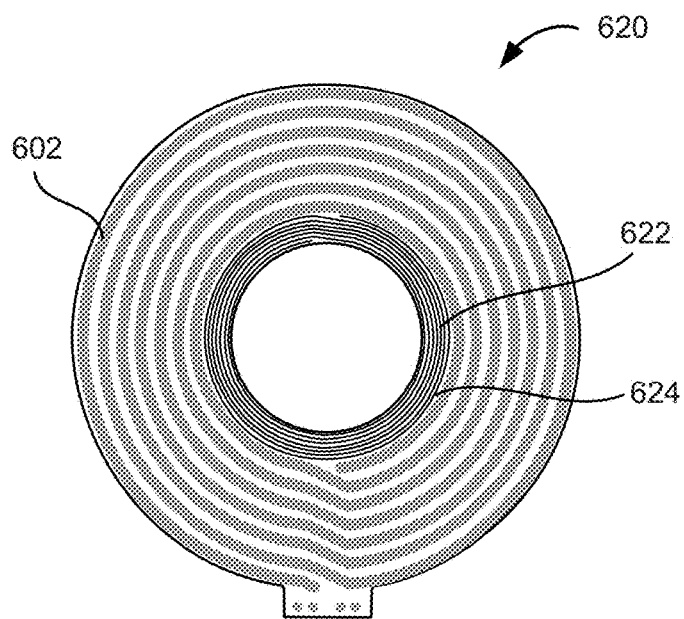
FIG. 6C is a simplified diagram illustrating an exemplary hybrid wireless charging system including a device detection coil in an inner-wound configuration, according to some embodiments of the present disclosure.

FIGS. 6A-6C illustrate different exemplary hybrid wireless charging systems that include hybrid receiver/transmitter coils and device detection coils for detecting the presence of an electronic device positioned to receive power from the hybrid receiver/transmitter coil, according to some embodiments of the present disclosure. The exemplary hybrid receiver/transmitter coils shown in FIGS. 6A-6C are constructed as FPC coils.

FIG. 6A illustrates an exemplary hybrid wireless charging system 600 that includes a hybrid receiver/transmitter coil 602 and a device detection coil 604 in an interwound configuration, according to some embodiments of the present disclosure. Hybrid receiver/transmitter coil 602 can be formed of a conductive coil that is a single length of patterned conductive trace wound into a plurality of turns. The wire can be wound about a center point and in increasing radii such that the resulting coil is substantially planar. As shown in FIG. 6A, the interwound configuration is arranged such that device detection coil 604 is wound within a portion of hybrid receiver/transmitter coil 602. For instance, device detection coil 604 can be wound in gaps between adjacent turns of conductive traces of hybrid receiver/transmitter coil 602. Device detection coil 604 can be interwound within any portion of hybrid receiver/transmitter coil 602. As an example, device detection coil 604 can be interwound near the outer edge 608 of hybrid receiver/transmitter coil 602 as shown in FIG. 6A. Alternatively, device detection coil 604 can be interwound near the inner edge 606 of hybrid receiver/transmitter coil 602, or within hybrid receiver/transmitter coil 602 away from either the outer edge 608 or inner edge 606.

Although FIG. 6A illustrates device detection coil 604 in an interwound configuration, embodiments are not limited to such configurations. For instance, a device detection coil can be wound around an outer edge of a hybrid receiver/transmitter coil or within an inner edge of a hybrid receiver/transmitter coil, as shown in FIGS. 6B and 6C. FIG. 6B illustrates an exemplary hybrid wireless charging system 610 including a device detection coil 612 in an outer-wound configuration, according to some embodiments of the present disclosure. In the outer-wound configuration, device detection coil 612 can be wound around an outer edge 614 of hybrid receiver/transmitter coil 602. FIG. 6C illustrates an exemplary hybrid wireless charging system 610 including a device detection coil 622 in an inner-wound configuration, according to some embodiments of the present disclosure. In the inner-wound configuration, device detection coil 622 can be wound outside of and proximate to an inner edge 624 of hybrid receiver/transmitter coil 602

Device detection coils 604, 612, and 622 can operate independently from hybrid receiver/transmitter coil 602 to detect the presence of an external device on a charging surface of a portable electronic device within which hybrid receiver/transmitter coil 602 is housed. For instance, detection coils 604, 612 and 622 can turn on to perform device detection while hybrid receiver/transmitter coil 602 is turned off and not generating time-varying magnetic flux. In addition to detecting the presence of an external device, device detection coils 604, 612, and 622 can also detect the presence of sensitive radio frequency identification (RFID) components, such as credit cards, that are sensitive to magnetic fields that are positioned on a charging surface of the portable electronic device. In such cases, if a sensitive RFID component is detected, the portable electronic device may be configured to ensure that hybrid receiver/transmitter coil 602 is not turned on so that it does not generate strong magnetic fields that are capable of erasing the credit card.

In some embodiments, device detection coils 604, 612, and 622 can operate at a different frequency than hybrid receiver/transmitter coil 602. As an example, device detection coils 604, 612, and 622 can operate at a higher frequency than hybrid receiver/transmitter coil 602. In addition to the difference in operating frequency, device detection coils 604, 612, and 622 can also be constructed differently than hybrid receiver/transmitter coil 602. In some embodiments, device detection coils 604, 612, and 622 have a narrower trace width than hybrid receiver/transmitter coil 602. The narrower width can allow device detection coils 604, 612, and 622 to operate at higher frequencies than hybrid receiver/transmitter coil 602.

According to some embodiments, control circuitry in a computing system, e.g., computing system 102 in FIG. 1, can be configured to operate hybrid receiver/transmitter coil 602 based on a detection signal from any of device detection coils 604, 612, and 622. For instance, device detection coils 604, 612, and 622 can generate a detection signal when an external device is detected to be positioned on a charging surface. The detection signal can be received by control circuitry, which can then use this information to turn on hybrid receiver/transmitter coil 602. In some embodiments, once a detection signal is received, control circuitry can determine whether the external device is a device that is suitable for providing power (e.g., a wireless charging device), or a device that is suitable for receiving power (e.g., a secondary electronic device). This determination can be made through communication with the external device, such as through Bluetooth communication or through power-modulating communication between the two coils. If it is determined that the external device is a wireless charging device, then the control circuitry can activate the switching mechanism to couple hybrid receiver/transmitter coil 602 to the power receiving circuitry to operate hybrid receiver/transmitter coil 602 to receive power. However, if it is determined that the external device is a secondary electronic device, then the control circuitry can activate the switching mechanism to couple hybrid receiver/transmitter coil 602 to the power transmitting circuitry to operate hybrid receiver/transmitter coil 602 to transmit power.

B. Stranded Coil

Figure 7:
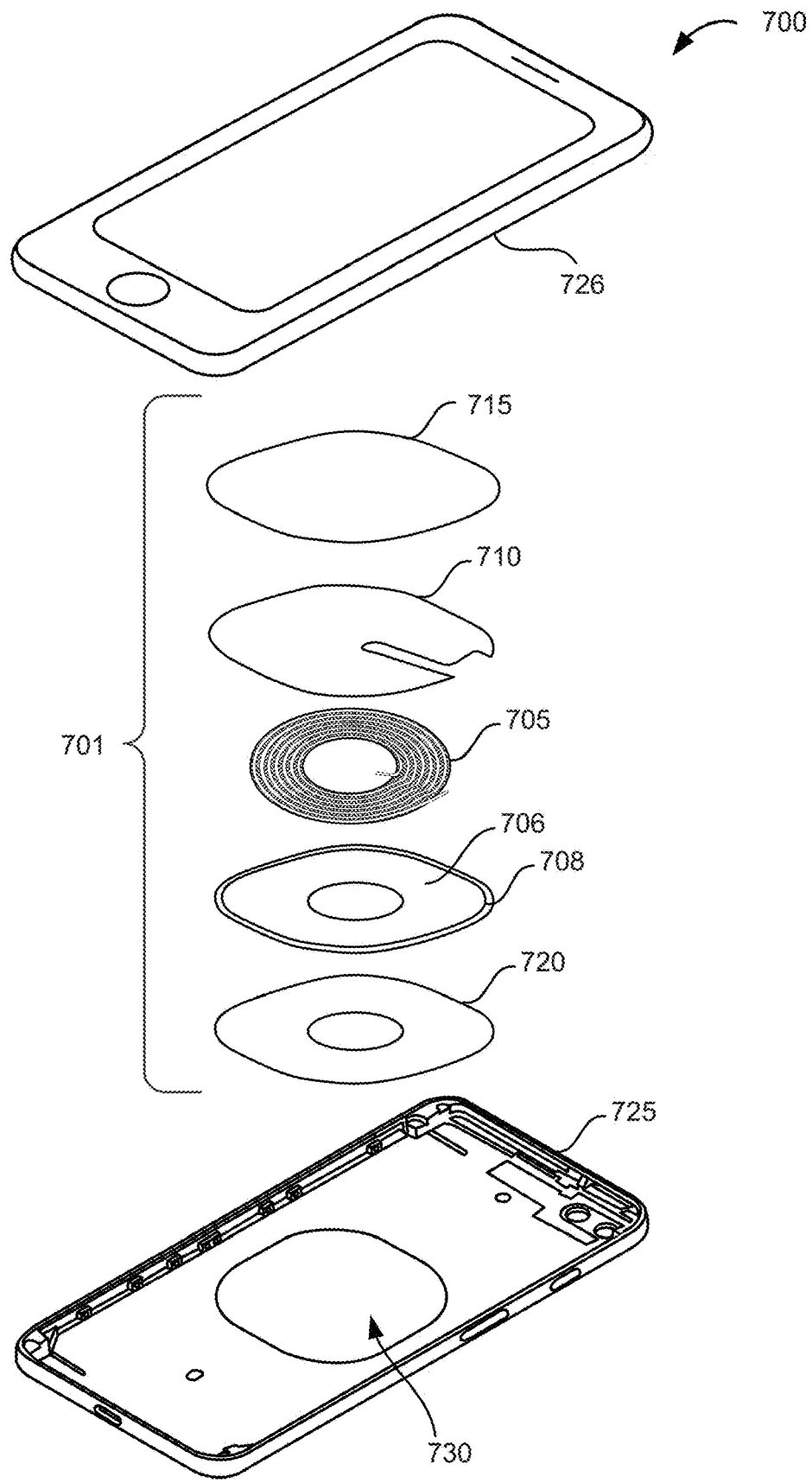
FIG. 7 is a simplified diagram illustrating an exploded view of a portable electronic device including a hybrid receiver/transmitter coil formed as a stranded coil, according to some embodiments of the disclosure.

Although a hybrid receiver/transmitter coil can be formed as a FPC coil, embodiments are not limited to such configurations. Rather, some embodiments can include hybrid charging systems that have a hybrid receiver/transmitter coil formed as a stranded coil. FIG. 7 illustrates an exploded view of a portable electronic device 700 including a hybrid receiver/transmitter coil 705 formed as a stranded coil, according to some embodiments of the disclosure. Portable electronic device 700 can include a top housing 726 and a bottom housing 725 that can mate to define an interior cavity. As shown in FIG. 7, portable electronic device 700 can include at least three separate shields: an electromagnetic shield 706, a ferromagnetic shield 710, and a thermal shield 715 along with an adhesive component 720 that attaches wireless power receiving/transmitting module 701 to housing 725. The three shields and the adhesive component function and are positioned in a way that is substantially similar to the corresponding components discussed herein with respect to FIGS. 3A-3C. Detail of those operations, functionalities, configurations, and positions can be referenced in FIG. 3A and are not discussed herein with respect to FIG. 7 for brevity. Unlike wireless power receiving/transmitting module 301 in FIG. 3A-3C, electromagnetic shield 706 and adhesive component 720 can include a center opening corresponding to an inner diameter of hybrid receiver/transmitter coil 705.

In some embodiments, unlike FPC coils whose device detection coil is formed as part of the same FPC as the hybrid receiver/transmitter coil, device detection coils for hybrid wireless charging systems can be implemented with the electromagnetic shield. As shown in FIG. 7, wireless power receiving/transmitting module 701 can include a device detection coil 708 that is positioned around a perimeter of electromagnetic shield 706. Further details with respect to stranded hybrid receiver/transmitter coil 705 and device detection coil 708 are discussed herein with respect to FIGS. 8A-8C.

Figure 8A:
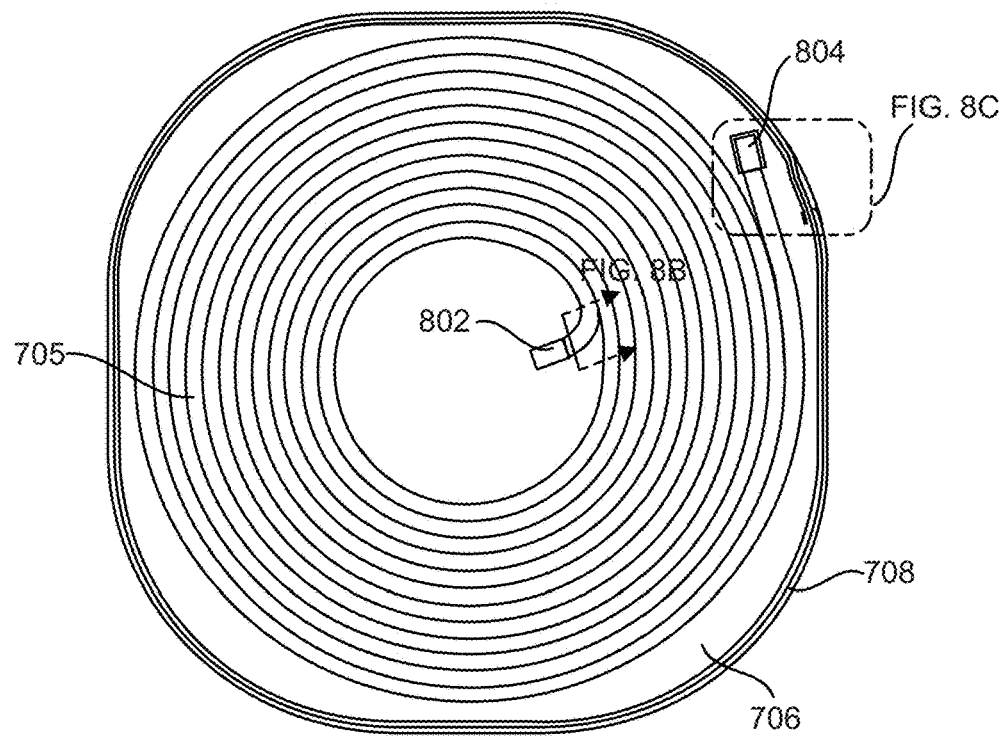
FIG. 8A is a simplified diagram illustrating a top-down view of an electromagnetic shield and a hybrid receiver/transmitter coil, according to some embodiments of the present disclosure.

FIG. 8A is a top-down view of electromagnetic shield 706 and a hybrid receiver/transmitter coil 705, according to some embodiments of the present disclosure. As shown, electromagnetic shield 706 is semi-transparent and superimposed over hybrid receiver/transmitter coil 705 so that the relative positioning and configurations of hybrid receiver/transmitter coil 705 and electromagnetic shield 706 can be observed. Hybrid receiver/transmitter coil 705 can be formed of a conductive coil that is a single length of conductive wire wound into a plurality of turns between a first termination end 802 and a second termination end 804. First termination end 802 can be positioned within an inner diameter of hybrid receiver/transmitter coil 705, and second termination end 804 can be positioned outside an outer diameter of hybrid receiver/transmitter coil 705. The wire can be wound about a center point and in increasing radii such that the resulting coil is substantially planar. In some embodiments, the wire is formed of a plurality of sub-wires configured in various ways, as further discussed herein with respect to FIG. 8B.

Figure 8B:
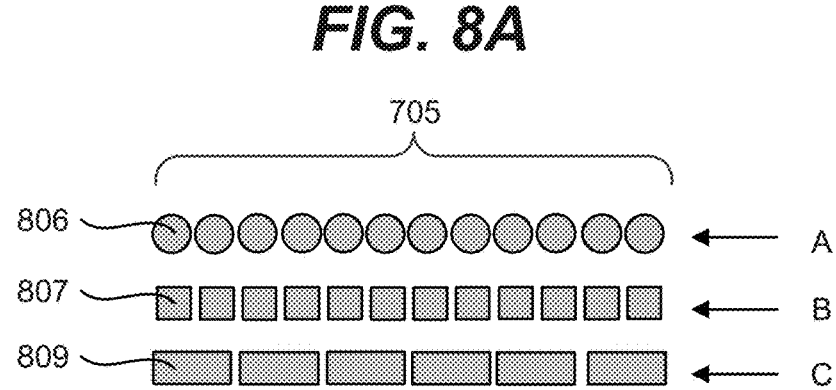
FIG. 8B is a simplified diagram illustrating a cross-sectional view of a strand of the conductive wire as shown by the cut line illustrated in FIG. 8A, according to some embodiments of the present disclosure.

FIG. 8B illustrates cross-sectional views of different configurations of the conductive wire as shown by the cut line illustrated in FIG. 8A. Specifically, FIG. 8B illustrates three non-limiting configurations: a first configuration A, a second configuration B, and a third configuration C. The conductive wire can include a plurality of sub-wires arranged in a single plane. Thus, each turn of wire in hybrid receiver/transmitter coil 705 can include a plurality of sub-wires. Forming the wire with a plurality of sub-wires allows the hybrid receiver/transmitter coil 705 to have a large number of turns, thereby enhancing the performance of hybrid receiver/transmitter coil 705.

According to configuration A, coil 705 can be formed of plurality of turns of wire, each turn of wire can include a plurality of sub-wires 806 that have a circular cross-sectional shape. In some embodiments, each turn of wire can include twelve sub-wires with circular-cross sectional shape that are coplanar with one another. Embodiments, however, are not limited to coils having sub-wires of circular cross-sectional shape. For instance, according to configuration B, each turn of coil 705 can include a plurality of sub-wires 807 that have a square-like cross-sectional shape. This enables sub-wires 807 to better utilize the space between sub-wires 807 to maximize the cross-sectional area of the wire for each turn. In such embodiments, each turn of wire can include twelve sub-wires with square-like cross-sectional shape that are coplanar with one another. And according to configuration C, each turn of coil 705 can include a plurality of sub-wires 807 that have a rectangular cross-sectional shape. In such embodiments, each turn of wire can include six sub-wires with rectangular cross-sectional shape that are coplanar with one another. It is to be appreciated that the number of sub-wires are not limited to what is shown in FIG. 8B and that other embodiments can have more or less than the number of sub-wires shown in FIG. 8B.

With reference back to FIG. 8A, electromagnetic shield 706 can be a sheet of material capable of blocking the propagation of electric filed while allowing the propagation of magnetic field through its structure, For instance, electromagnetic shield 706 can include a layer of silver laminated against a layer of polyethylene terephthalate (PET), which can function as a support structure for the layer of silver. According to some embodiments of the present disclosure, device detection coil 708 can be attached to electromagnetic shield 706. As an example, device detection coil 708 can be a patterned conductive trace formed around an outer perimeter of electromagnetic shield 706 and attached to a side of electromagnetic shield 706 on which hybrid receiver/transmitter coil 705 is also attached. In some instances, the outer profile of device detection coil 708 can correspond to the outer profile of electromagnetic shield 706. For example, the outer profile of electromagnetic shield 706 is substantially square-like with rounded corners, as shown in FIG. 8A. Accordingly, the outer profile of device detection coil 708 can also have a square-like shape with rounded corners. In certain embodiments, the outer profile of device detection coil 708 can be different from the outer profile of hybrid receiver/transmitter coil 705, which can be substantially circular. Configuring device detection coil 708 around hybrid receiver/transmitter coil 705 enables device detection coil 708 to determine whether a secondary device is positioned to receive power from hybrid receiver/transmitter coil 705. A close-up view of device detection coil 708 patterned on electromagnetic shield 706 is shown in FIG. 8C.

Figure 8C:
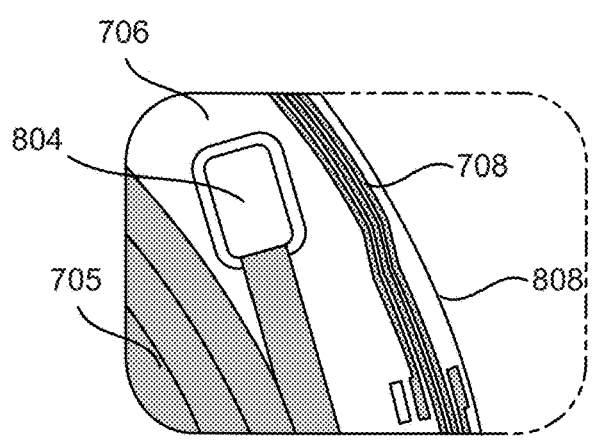
FIG. 8C is a simplified diagram illustrating a close-up top-down view of a portion of an electromagnetic shield, according to some embodiments of the present disclosure.

FIG. 8C illustrates a close-up top-down view of a portion of electromagnetic shield 706, according to some embodiments of the present disclosure. As shown, device detection coil 708 can be patterned proximate to an outer edge 808 of electromagnetic shield 706. In some embodiments, device detection coil 708 is patterned proximate to outer edge 808 so that it is positioned outside of an outer perimeter of hybrid receiver/transmitter coil 705. Configuring device detection coil 708 around hybrid receiver/transmitter coil 705 enables device detection coil 708 to determine whether a secondary device overlaps with any region of the entire surface of hybrid receiver/transmitter coil 705. In some embodiments, the patterned conductive trace width for device detection coil 708 is narrower than the stranded coil width of hybrid receiver/transmitter coil 705. Similar to device detection coils 604, 612, and 622 discussed herein with respect to FIGS. 6A-6B, device detection coil 708 can operate at a different frequency than hybrid receiver/transmitter coil 705 to detect the presence of secondary electronic devices and/or sensitive RFID components.

Although the embodiments discussed herein with respect to FIGS. 7 and 8A-8C only include one stranded coil, embodiments are not limited to such embodiments. Some embodiments can include more than one stranded coil arranged in a specific pattern to generate an array of magnetic fluxes that forms a continuous charging surface upon which an electronic device can be charged. The continuous charging surface allows an electronic device to be efficiently charged at any location within a broad region of the charging surface.

Figure 8D:
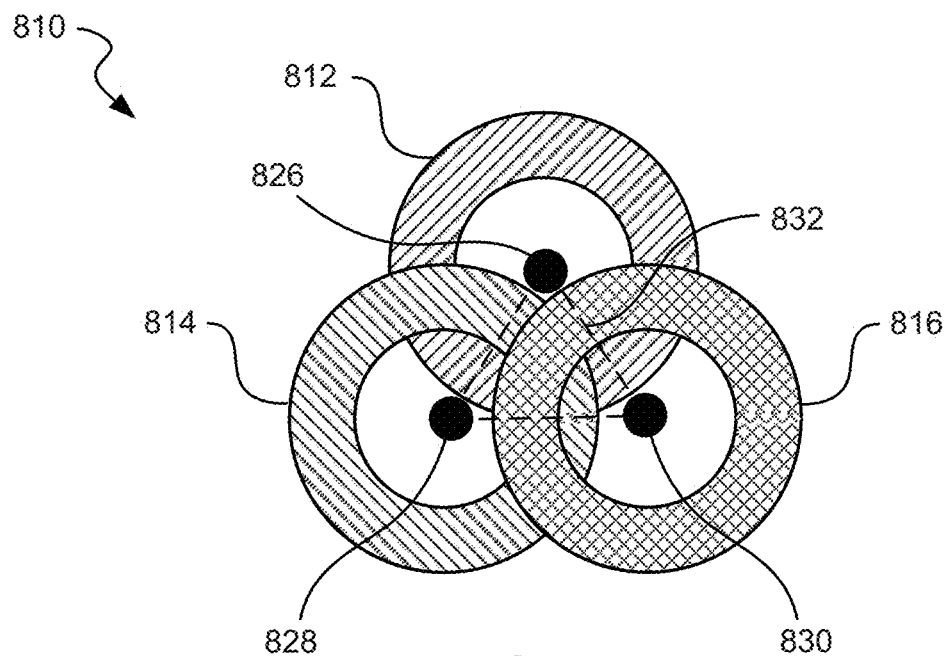
FIG. 8D is a simplified diagram illustrating an exemplary pattern having three transmitter coils, according to some embodiments of the present disclosure.
Figure 8E:
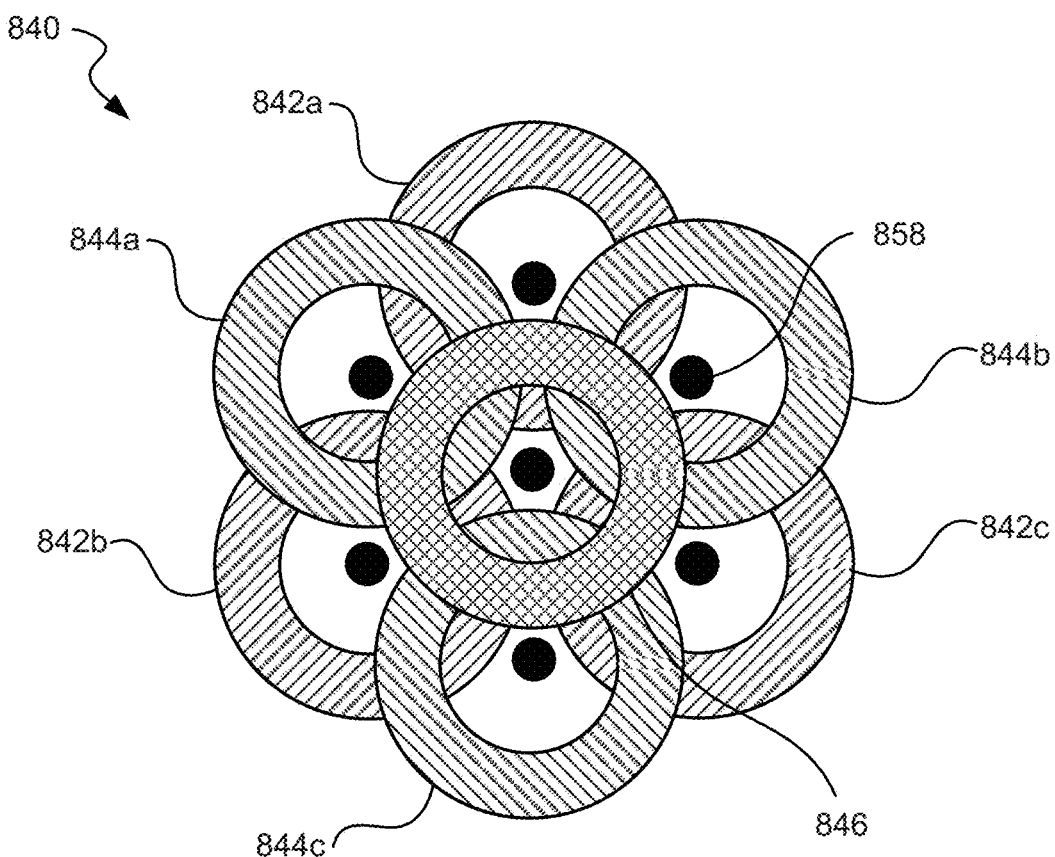
FIG. 8E is a simplified diagram illustrating an exemplary transmitter coil arrangement configured in a rosette pattern, according to some embodiments of the present disclosure.

FIG. 8D an exemplary pattern 810 having three inductive coils: first inductive coil 812, second inductive coil 814, and third inductive coil 816, according to some embodiments of the present disclosure. Each inductive coil can be a hybrid receiver/transmitter coil that can receive wireless power by interacting with magnetic fields or transmit wireless power by generating magnetic fields as discussed herein. Furthermore, each inductive coil can operate individually, meaning each inductive coil can be activated without activating the other inductive coils; and each inductive coil can provide power at the same frequency, phase, and amplitude. First, second, and third inductive coils 812, 814, and 816 can be arranged in three separate layers, thereby forming a inductive coil stack. For example, first inductive coil 812 can be positioned in a first layer, second inductive coil 814 can be positioned in a second layer above the first layer, and third inductive coil 816 can be positioned in a third layer above the first and second layers. Each inductive coil can be formed of a single layer of wire that is wound from an outer radius to an inner radius so that it forms a flat, ring-like shape, as discussed herein with respect to FIG. 7.

In some embodiments, first, second, and third inductive coils 812, 814, and 816 can each include a central termination zone. A central termination zone can be a region at the center of each inductive coil that is reserved for interfacing with an interconnection layer, such as a printed circuit board (PCB). As shown in FIG. 8D, first, second, and third inductive coils 812, 814, and 816 can have central termination zones 826, 828, and 830, respectively. Central termination zones 826, 828, and 830 can be regions at the center of each inductive coil reserved for interfacing with the interconnection layer. Accordingly, first, second, and third inductive coils 812, 814, and 816 can be positioned in locations where their respective central termination zones can interface with the interconnection layer without being blocked by a neighboring inductive coil. For instance, central termination zone 826 of inductive coil 812 is laterally positioned outside of the outer diameter of inductive coil 814 and 816. The same can be said for central termination zones 828 and 830. Accordingly, central termination zones 826, 828, and 830 can extend through the inductive coil stack without intersecting another inductive coil. In some embodiments, central termination zones 826, 828, and 830 may be positioned equally spaced apart from one another such that the central termination zones 826, 828, and 830 form an equilateral triangle 832.

In certain embodiments, pattern 810 can be expanded upon to form other patterns for different shapes and sizes of wireless charging mats. One of such patterns is a rosette pattern, which may be suitable for substantially circular wireless charging regions. The rosette pattern can be a pattern where the inductive coils are arranged in an overlapping arrangement such that different coils in the plurality of coils are on different planes and are non-concentric with each other. In an expanded base pattern, one or more inductive coil layers can include more than one inductive coil.

FIG. 4 illustrates an exemplary inductive coil arrangement 840 configured in a rosette pattern, according to some embodiments of the present disclosure. Inductive coil arrangement 840 can include three separate inductive coil layers where one or more of those layers include multiple inductive coils. For example, a first inductive coil layer can include inductive coils 842*a-c*, a second inductive coil layer can include inductive coils 844*a-c*, and a third inductive coil layer can include inductive coil 846. Each inductive coil in inductive coil arrangement 840 can have an opening defined by an inner diameter of the inductive coil, where each opening includes a termination zone 858 (i.e. central portion) that is not overlapping any portion of an adjacent inductive coil. Additionally, the inductive coils are arranged such that no two coils in the plurality of coils are concentric with each other.

The base pattern may be pervasive throughout the rosette pattern such that every group of three inductive coils, one in each inductive coil layer, that are closest together is arranged in the base pattern. For instance, inductive coils 842*a*, 844*a*, and 846 are arranged in the base pattern. Likewise, inductive coils 842*a*, 844*b*, and 846 are arranged in the base pattern, inductive coils 844b, 842c, and 846 are arranged in the base pattern, and so on and so forth. By arranging inductive coil arrangement 840 according to the base pattern, inductive coil arrangement 840 can create a continuous charging region within which an electronic device can charge in any location.

Figure 8F:
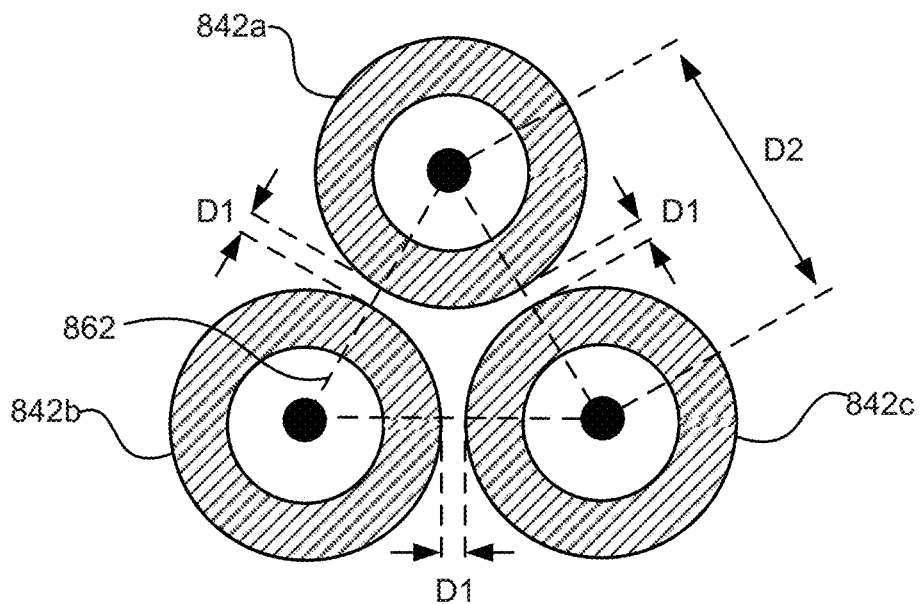
FIGS. 8F-8H are simplified diagrams illustrating the different layers of a transmitter coil arrangement configured in a rosette pattern, according to some embodiments of the present disclosure.
Figures 8G, 8H:
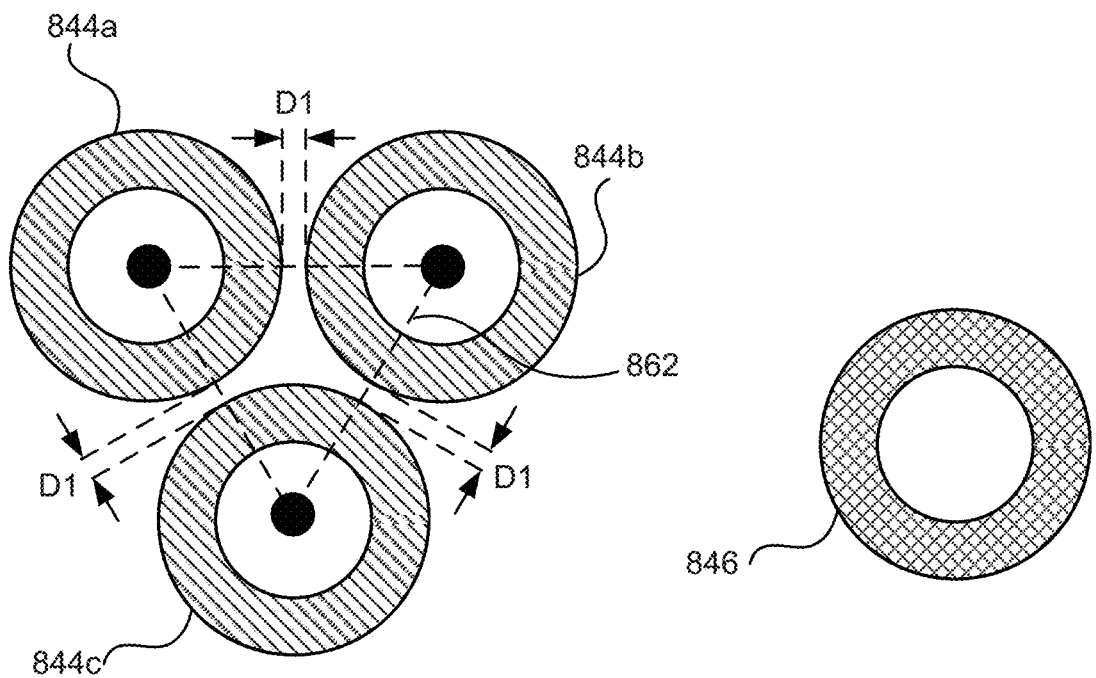

To better understand the arrangement of an expanded base pattern, FIGS. 8F-8H illustrate the different layers of inductive coil arrangement 840. Specifically, FIG. 8F illustrates the first layer including inductive coils 842a-c, FIG. 8G illustrates the second layer including inductive coils 844a-c, and FIG. 5H illustrates the third layer including inductive coil 846. According to embodiments, inductive coils in the same layer can be equally spaced apart so that the generated magnetic fields can be arranged in an evenly spaced grid pattern. For example, inductive coils 842a-c and 844a-c can be spaced apart by a distance D1. The distance D1 may be selected to be wide enough for parts of inductive coils in other layers to fit within it for stacking purposes, as will be discussed further herein. In other embodiments, the distance D1 may be selected to be wide enough so that adjacent inductive coils do not make contact with each other. For instance, distance D1 may be less than 3 mm. In a particular embodiment, distance D1 is less than 1 mm.

The center of each inductive coil in the same layer can be separated by a distance D2. Distance D2 can affect the uniformity of magnetic flux across the charging surface. Larger distances D2 result in lower magnetic flux uniformity across the charging surface, whereas smaller distances D2 result in higher magnetic flux uniformity across the charging surface. In some embodiments, distance D2 is selected to be the smallest distance that allows for a suitable distance D1 between inductive coils while taking into consideration the outer diameter of each inductive coil. In additional embodiments, distance D2 is the same for all adjacent inductive coils in the same layer. Thus, groups of three inductive coils (e.g., inductive coils 842a-c and 844a-c in each of the first and second layers, respectively) can be arranged according to the end points of an equilateral triangle 862.

Figure 9A:
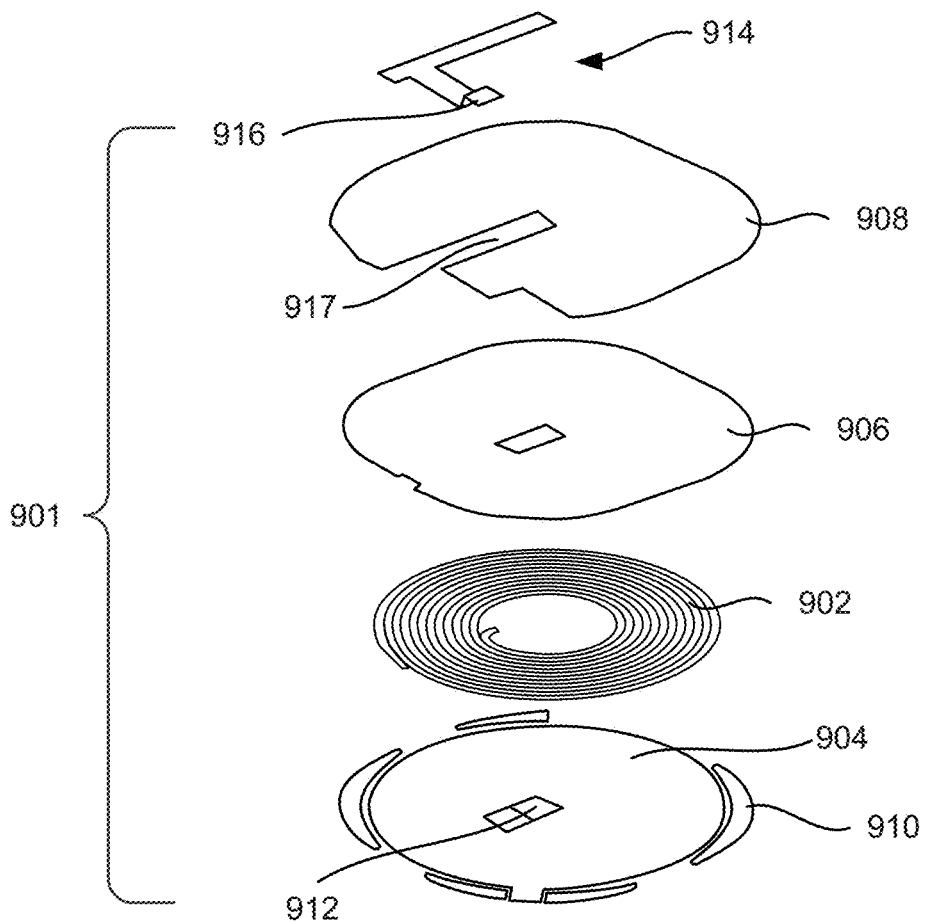
FIG. 9A is a simplified diagram illustrating an exploded view of another exemplary wireless power receiving/transmitting module having a stranded hybrid receiver/transmitter coil for a portable electronic device, according to some embodiments of the present disclosure.

FIG. 9A illustrates an exploded view of another exemplary wireless power receiving/transmitting module 901 having a stranded hybrid receiver/transmitter coil 902 for a portable electronic device, according to some embodiments of the present disclosure. Like module 701, power receiving/transmitting module 901 can include three separate shields: an electromagnetic shield 904, a ferromagnetic shield 906, and a thermal shield 908 along with an adhesive component 910 that attaches wireless power receiving/transmitting module 901 to the housing of the portable electronic device. The three shields and the adhesive component function and are positioned in a way that is substantially similar to the corresponding components discussed herein with respect to FIGS. 3A-3C. Unlike wireless power receiving/transmitting module 701 in FIG. 7, electromagnetic shield 904 can have an outer diameter that substantially matches the outer diameter of hybrid receiver/transmitter coil 902, and adhesive component 910 can include four portions that are structured and function similar to double-sided adhesives 340a-b in FIG. 3C to attach ferromagnetic shield 906 to the housing of the portable electronic device without overlapping with hybrid receiver/transmitter coil 902. Electromagnetic shield 904 can be a separate structure that is bonded to a surface of coil 902 with an adhesive (not shown). Ferromagnetic shield 906 can be formed of any suitable ferromagnetic material, such as a nickel zinc ferrite material or a nanocrystalline foil. The nanocrystalline foil can be formed of multiple layers of nanocrystalline material separated by adhesive layers.

In some embodiments, power receiving/transmitting module 901 is coupled to an interconnection component 914 for enabling operation of coil 902 and the grounding of electromagnetic shield 904. Interconnection component 914 can be a flexible circuit board that has a coupling end 916 whose z-height can fit within the z-height of module 901. Accordingly, thermal shield 908 can have a cutout region 917 that follows a portion of interconnection component 914, where cutout region 917 extends from the center of module 901 to an edge of module 901 to provide space within which interconnection component 914 can be positioned. Furthermore, ferromagnetic shield 906 and electromagnetic shield 904 can also have cutout regions 907 and 905, respectively, that can provide space within which coupling end 916 can be positioned without substantially impacting the z-height of module 901. In particular embodiments, coupling end 916 of interconnection component 914 is positioned at the center and/or within the inner diameter of hybrid receiver/transmitter coil 902 (i.e., at the center of power receiving/transmitting module 901) so that coil 902 can have one termination end that is coupled to coupling end 916 at the center of module 901, and electromagnetic shield 904 can terminate at the center of module 901 on coupling end 916 for coupling to ground.

Figure 9B:
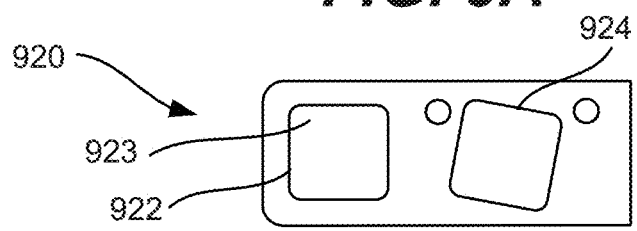
FIGS. 9B-9C are simplified diagrams illustrating pads on a coupling end of an interconnection component for a power receiving/transmitting module, according to some embodiments of the present disclosure.
Figure 9C:
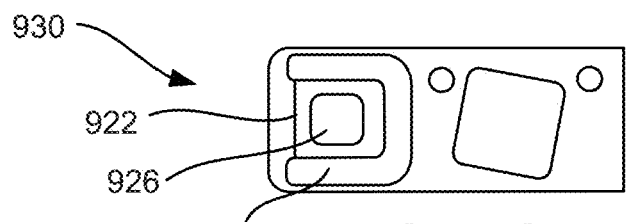

In some embodiments, coupling end 916 of interconnection component 914 can include two or more pads for coupling with hybrid receiver/transmitter coil 902 and electromagnetic shield 904. FIG. 9B is a magnified top-down view of coupling end 916 of interconnection component 914, according to some embodiments of the present disclosure. As shown, coupling end 916 can include two pads: a first contact pad 922 and a second contact pad 924 that are positioned adjacent to each other at coupling end 916. First contact pad 922 can be coupled to electromagnetic shield 904 to couple electromagnetic shield 904 to ground, and second contact pad 924 can be coupled to coil 902 to enable operation of coil 902. In some embodiments, second contact pad 924 is tilted to a certain degree with respect to first contact pad 922 so that each contact pad can be better oriented to couple with the respective shield and coil connections. An adhesive 923 can attach an end of electromagnetic shield 904 to interconnection component 914. In some embodiments, adhesive 923 can be coated over the entire surface of first contact pad 922 as shown in FIG. 9B, or can include two portions 926 and 928 that are coated over portions of first contact pad 922 as shown in FIG. 9C. Portion 926 can cover a portion of a center of first contact pad 922, and portion 928 can cover a portion of the outer edges of first contact pad 922 such that portion 928 is U-shaped.

C. Alignment Mechanisms for Hybrid Wireless Charging Systems

As mentioned herein, a hybrid receiver/transmitter coil can not only receive power, but also transmit power. To transmit power, a receiver coil in a secondary electronic device often needs to be aligned with the hybrid receiver/transmitter coil in the portable electronic device to maximize power transfer efficiency. Thus, hybrid wireless charging systems according to some embodiments of the present disclosure can include one or more alignment mechanisms. The alignment mechanisms can assist in aligning a receiver coil in a secondary device with a hybrid receiver/transmitter coil in a portable electronic device. For instance, in some embodiments, the alignment mechanism can be passive magnetic devices that attract corresponding magnets positioned in a secondary electronic device to align the receiver coil with the hybrid receiver/transmitter coil. Alternatively, the alignment mechanism can be active proximity detection devices that determine the relative location of a receiver coil with respect to the hybrid receiver/transmitter coil, as will be discussed further herein.

FIGS. 10A-10D illustrate different alignment mechanisms for hybrid wireless charging systems, according to some embodiments of the present disclosure. In some embodiments, the alignment mechanisms can be disposed between housing 325/725 (see FIGS. 3A and 7) and adhesive layer 320/attachment assembly 332 and 338 (see FIGS. 3A-3C). The alignment mechanisms illustrated in FIGS. 10A-10D are shown superimposed over an attachment assembly including single sided adhesive 336 and double-sided adhesives 334a and 334b, along with hybrid receiver/transmitter coil 305 disposed under adhesives 336, 334a, and 334b. Adhesives 336, 334a, and 334b are discussed in detail herein with respect to FIGS. 3B and 3C and are not repeated for brevity.

Figures 10A, 10B:
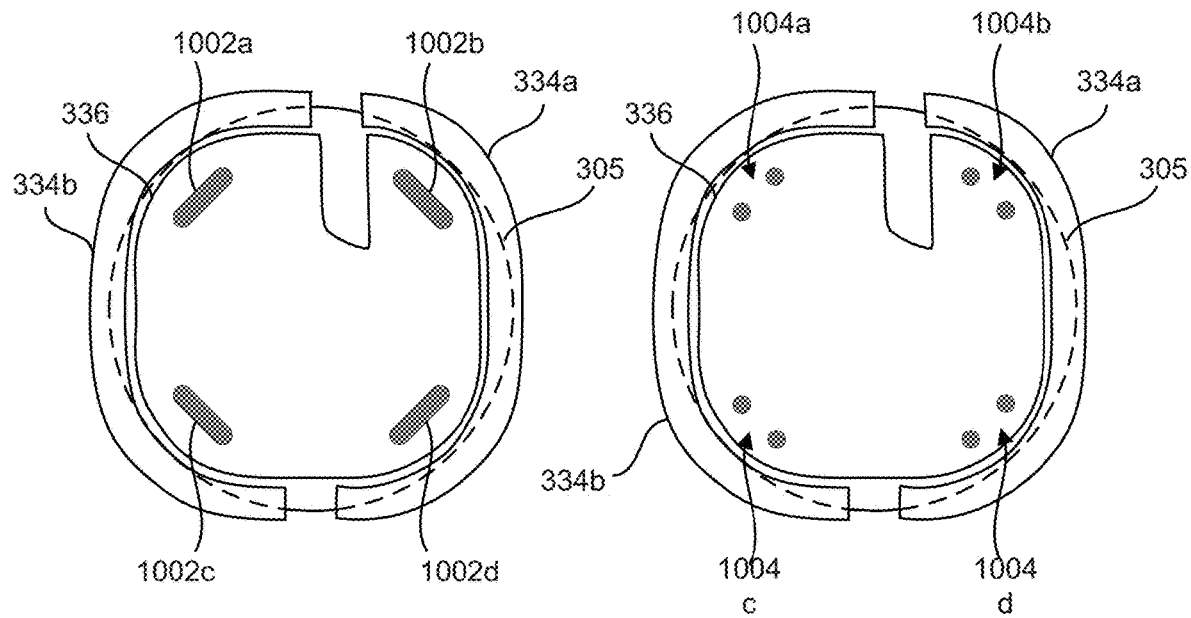
FIGS. 10A-10D are simplified diagrams illustrating different alignment mechanisms for hybrid wireless charging systems, according to some embodiments of the present disclosure.

According to some embodiments of the present disclosure, the alignment mechanism can be a passive alignment mechanism that includes one or more permanent magnets. For instance, FIG. 10A illustrates an exemplary alignment mechanism formed of magnets 1002a-d positioned at corners of a square configuration, according to some embodiments of the present disclosure. Magnets 1002a-d can be configured as rounded rectangular shapes, or any other suitable shape such as circular, square, trapezoidal, and ovular shapes. In some other embodiments, different configurations of magnets can be used. For instance, FIG. 10B illustrates an exemplary alignment mechanism formed of paired magnets 1004a-d positioned at corners of a square configuration, according to some embodiments of the present disclosure. Each paired magnet 1004a-d can include at least two magnets positioned beside one another in the configuration shown in FIG. 10B. FIGS. 10A and 10B illustrate alignment mechanisms formed of four magnets positioned in a square configuration, however other embodiments can have different numbers of magnets and be positioned differently. For instance, some embodiments can have more or less than four magnets and be positioned around a perimeter of single-sided adhesive 336 or on only two sides of single-sided adhesive 336.

Figures 10C, 10D:
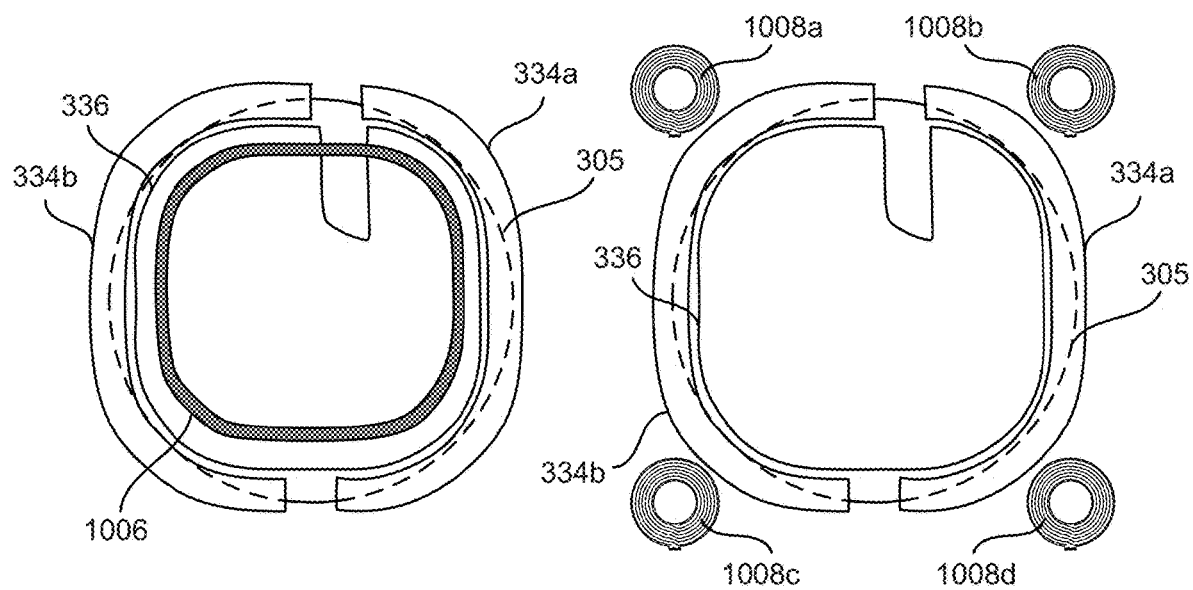

Although FIGS. 10A and 10B illustrate alignment mechanisms formed of a plurality of magnets positioned in a square configuration, embodiments are not limited to such configurations. In some embodiments, the alignment mechanism can be formed of a perimeter magnet as shown in FIG. 10C. FIG. 10C illustrates an exemplary alignment mechanism formed of a perimeter magnet 1006, according to some embodiments of the present disclosure. Perimeter magnet 1006 can be a ring-like structure that has a rounded rectangle profile, as shown in FIG. 10C. Perimeter magnet 1006 can have a profile that is substantially similar to the outer profile of single-sided adhesive 336 or adhesive layer 320/720.

FIG. 10D illustrates an exemplary alignment mechanism formed of an arrangement of proximity detection coils 1008a-d, according to some embodiments of the present disclosure. Each proximity detection coil 1008a-d can be formed of a coil of wire that can be actively used to detect the position of an external device. For instance, proximity detection coil 1008a can be operated to detect whether an external device is positioned proximate to coil 1008a. If coil 1008a detects that an external device is positioned proximate to coil 1008a, then a computing system, such as computing system 102 in FIG. 1 can determine that a secondary device is misaligned because it is positioned near the top left position of hybrid receiver/transmitter coil 305.

In some embodiments, sufficient alignment can be detected by computing system 102 when all proximity detection coils 1008a-d detect that an external device is proximately positioned.

According to some embodiments, proximity detection coils 1008a-d can be used to aid a user in achieving alignment between hybrid receiver/transmitter coil 305 and a receiver coil in a secondary electronic device. In such embodiments, computing system 102 can use proximity detection coils 1008a-d to determine a position of the secondary electronic device by determining which detection coils 1008a-d are detecting the proximity of the secondary electronic device. If only detection coil 1008a is detecting the proximity of the secondary electronic device, then computing system 102 can determine that the two coils are misaligned.

In some embodiments, computing system 102 can be configured to notify the user that hybrid receiver/transmitter coil 305 is misaligned with the receiver coil in the secondary electronic device. The notification can be performed by operating a light-emitting diode (LED) observable by the user. As an example, the LED can emit a red color when the coils are misaligned, and a green color when the coils are aligned; or, the LED can "breathe" by gradually pulsing light at a frequency corresponding to a degree of alignment between the two coils. For instance, the LED can pulse at a higher frequency when the two coils are closer to alignment and a lower frequency when the two coils are farther from alignment.

In addition to merely notifying the user of alignment/misalignment, computing system 102 can also aid the user to move the secondary device toward alignment. For instance, computing system 102 can output an instruction on a display to aid the user in moving the secondary electronic device toward alignment. Following the example above, if only coil 1008a is detecting proximity of the secondary electronic device, then computing system 102 can instruct the user to move the secondary electronic device in a bottom-right direction. Once all four device detection coils 1008a-d detect proximity of the secondary electronic device, computing system 102 can output an instruction on the display to stop moving the secondary electronic device because the two coils are aligned.

Although FIG. 10D illustrates device detection coils 1008a-d as circular in shape, embodiments are not so limited. Other embodiments can have device detection coils that have profiles in the shape of rectangles, squares, triangles, or any other geometric shapes. Furthermore, embodiments do not necessarily require four detection coils arranged in a square configuration as shown in FIG. 10D. Other embodiments can have more or less device detection coils arranged in other configurations.

Although the invention has been described with respect to specific embodiments, it will be appreciated that the invention is intended to cover all modifications and equivalents within the scope of the following claims.

What is claimed is:

1. A portable electronic device, comprising:
a housing having an interface surface;
an inductor coil disposed within the housing and comprising a conductive wire wound in a plurality of turns about a center point and in increasing radii such that the inductor coil is substantially planar;
charging circuitry coupled to the inductor coil and configured to operate the inductor coil to wirelessly receive power and wirelessly transmit power;

control circuitry coupled to the charging circuitry and configured to instruct the charging circuitry to operate the inductor coil to wirelessly receive power and to wirelessly transmit power; and a device detection coil coupled to the control circuitry and configured to detect a presence of an external device on the interface surface, wherein the device detection coil is configured to operate at a different frequency from the inductor coil and is constructed of a wire having a narrower trace width than the conductive wire of the inductor coil.

2. The portable electronic device of claim 1, wherein the conductive wire of the inductor coil is formed of a plurality of sub-wires arranged in a single plane.

3. The portable electronic device of claim 1, further comprising an electromagnetic shield disposed between the inductor coil and the interface surface and comprising a substrate layer and a conductive layer attached to the substrate layer, the electromagnetic shield being configured to intercept electric field while allowing magnetic flux to pass through.

4. The portable electronic device of claim 3, wherein the inductor coil and the device detection coil are attached to the electromagnetic shield.

5. The portable electronic device of claim 3, wherein an outer profile of the device detection coil is the same as an outer profile of the electromagnetic shield, and wherein the device detection coil is positioned at an outer perimeter of the electromagnetic shield.

6. The portable electronic device of claim 1, wherein the inductor coil has a first outer profile and the device detection coil has a second outer profile different from the inductor coil.

7. The portable electronic device of claim 1, wherein the device detection coil is disposed outside of an outer perimeter of the inductor coil.

8. The portable electronic device of claim 1, wherein the device detection coil is formed of a patterned conductive trace on a substrate, and the inductor coil is formed of a stranded coil.

9. The portable electronic device of claim 1, further comprising a magnetic material disposed between adjacent turns of the plurality of turns of the conductive wire of the inductor coil.

10. The portable electronic device of claim 9, wherein the conductive wire of the inductor coil is formed of a plurality of sub-wires arranged in a single plane, and wherein the magnetic material is further disposed between adjacent sub-wires of each turn of conductive wire.

11. A portable electronic device, comprising:
a housing having an interface surface;
an inductor coil disposed within the housing and comprising a conductive wire wound in a plurality of turns about a center point and in increasing radii such that the inductor coil is substantially planar;
an electromagnetic shield disposed between the inductor coil and the interface surface, the electromagnetic shield comprising a substrate layer and a conductive layer attached to the substrate layer and configured to intercept electric fields while allowing magnetic flux to pass through;
an interconnection component comprising a first contact pad and a second contact pad positioned at a coupling end of the interconnection component; the first contact pad configured to couple with the electromagnetic shield, and the second contact pad configured to couple with the inductor coil; and
a device detection coil configured to detect the presence of an external device on the interface surface, wherein the device detection coil is configured to operate at a different frequency from the inductor coil and is constructed of a wire having a narrower trace width than the conductive wire of the inductor coil.

12. The portable electronic device of claim 11, further comprising charging circuitry disposed within the housing and coupled to the inductor coil, wherein the charging circuitry is configured to receive current from the inductor coil.

13. The portable electronic device of claim 12, wherein the interconnection component comprises a flexible circuit and is configured to ground the electromagnetic shield and couple the inductor coil to the charging circuitry.

14. The portable electronic device of claim 11, wherein the interconnection component is a flexible circuit board.

15. The portable electronic device of claim 11, wherein the coupling end is positioned at a center of the inductor coil such that the electromagnetic shield and the inductor coil both terminate at the center of the inductor coil.

16. The portable electronic device of claim 11, wherein the conductive wire of the inductor coil comprises a stranded coil, each strand having a cross-sectional profile in the shape of a square, circle, or rectangle.

17. A wireless charging system, comprising:
a wireless charging device comprising a transmitter coil; and
a portable electronic device configured to receive power from the wireless charging device, wherein the portable electronic device comprises:
a housing having an interface surface;
an inductor coil disposed within the housing and comprising a conductive wire wound in a plurality of turns about a center point and in increasing radii such that the inductor coil is substantially planar;
charging circuitry coupled to the inductor coil and configured to operate the inductor coil to wirelessly receive power and wirelessly transmit power;
control circuitry coupled to the charging circuitry and configured to instruct the charging circuitry to operate the inductor coil to wirelessly receive power and to wirelessly transmit power; and
a device detection coil coupled to the control circuitry and configured to detect a presence of an external device on the interface surface, wherein the device detection coil is configured to operate at a different frequency from the inductor coil and is constructed of a wire having a narrower trace width than the conductive wire of the inductor coil.

18. The wireless charging system of claim 17, further comprising an electromagnetic shield disposed between the inductor coil and the interface surface and comprising a substrate layer and a conductive layer attached to the substrate layer, the electromagnetic shield being configured to intercept electric field while allowing magnetic flux to pass through.

* * * * *